United States Patent
Ellenbeck et al.

(10) Patent No.: US 12,381,600 B2
(45) Date of Patent: Aug. 5, 2025

(54) RESOURCE ALLOCATION FOR COMMUNICATION VIA REFLECTIVE SURFACES

(71) Applicant: Apple Inc., Cupertino, CA (US)

(72) Inventors: Jan Ellenbeck, Grunwald (DE); Bertram R Gunzelmann, Koenigsbrunn (DE); Stefan Meyer, Hochstadt (DE)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/321,698

(22) Filed: May 22, 2023

(65) Prior Publication Data

US 2023/0421207 A1    Dec. 28, 2023

Related U.S. Application Data

(60) Provisional application No. 63/355,524, filed on Jun. 24, 2022.

(51) Int. Cl.
*H04B 7/04*    (2017.01)
*H04B 7/0413*    (2017.01)

(52) U.S. Cl.
CPC ....... *H04B 7/04013* (2023.05); *H04B 7/0413* (2013.01)

(58) Field of Classification Search
CPC .......................... H04B 7/04013; H04B 7/0413
See application file for complete search history.

(56) References Cited

U.S. PATENT DOCUMENTS

| | | | |
|---|---|---|---|
| 2022/0086820 A1 | 3/2022 | Dallal et al. | |
| 2024/0187078 A1* | 6/2024 | Gaal | H04B 7/063 |
| 2024/0305336 A1* | 9/2024 | Åström | H04B 7/04013 |

FOREIGN PATENT DOCUMENTS

| | | |
|---|---|---|
| CN | 111181615 A | 5/2020 |
| CN | 114221680 A | 3/2022 |
| CN | 114614925 A | 6/2022 |
| CN | 115549733 A | 12/2022 |
| EP | 4160820 A1 | 4/2023 |
| WO | 2021239311 A1 | 12/2021 |
| WO | 2022000402 A1 | 1/2022 |
| WO | 2022037372 A1 | 2/2022 |
| WO | 2023025888 A2 | 3/2023 |

* cited by examiner

*Primary Examiner* — Janice N Tieu
(74) *Attorney, Agent, or Firm* — Treyz Law Group, P.C.; Michael H. Lyons

(57) ABSTRACT

A controller may map user equipment (UE) devices in a wireless system to access points (AP) and reflective intelligent surfaces (RIS). The controller may generate a corresponding communications schedule based on the locations of the UE device(s), AP(s), and RIS(s) and based on current traffic demands. The controller may control the RIS(s), AP(s), and UE devices to implement the schedule. The schedule may divide the time, frequency, and/or spatial resources of the RIS(s) to meet the traffic demands of the UE devices using a space division multiple access scheme, a time-division multiple access scheme, a frequency-division multiple access scheme, and/or a distributed multiple-input and multiple output scheme. The schedule may be updated over time as needed. The RIS(s) may allow for a reduction in the number of AP(s) required to meet the dynamic demands of the UE devices, thereby minimizing deployment and operating costs.

20 Claims, 18 Drawing Sheets

RESOURCE ALLOCATION FOR COMMUNICATION VIA REFLECTIVE SURFACES

This application claims the benefit of U.S. Provisional Patent Application No. 63/355,524, filed Jun. 24, 2022, which is hereby incorporated by reference herein in its entirety.

FIELD

This disclosure relates generally to electronic devices and, more particularly, to electronic devices with wireless circuitry.

BACKGROUND

Electronic devices can be provided with wireless capabilities. An electronic device with wireless capabilities has wireless circuitry that includes one or more antennas. The wireless circuitry is used to perform communications using radio-frequency signals conveyed by the antennas.

As software applications on electronic devices become more data-intensive over time, demand has grown for electronic devices that support wireless communications at higher data rates. However, the maximum data rate supported by electronic devices is limited by the frequency of the radio-frequency signals. As the frequency of the radio-frequency signals increases, it can become increasingly difficult to perform satisfactory wireless communications because the signals become subject to significant over-the-air attenuation and typically require line-of-sight. Communications can be particularly challenging in environments with many electronic devices that wish to perform wireless communications.

SUMMARY

A wireless communications system may have a controller, user equipment (UE) devices, wireless access points (AP's), and one or more reconfigurable intelligent surfaces (RIS's). External objects may block LOS paths between one or more of the UE devices and the AP's. The RIS's may be used to reflect radio-frequency signals between the UE devices and the AP's. The radio-frequency signals may be transmitted at frequencies greater than or equal to 100 GHz.

A controller may map the UE devices to one or more AP's and one or more RIS's. The controller may generate a schedule for communications between the UE devices and the AP's via the RIS's based on the location of the UE devices, AP's, and RIS's, based on the traffic demands of each of the UE devices, etc. The controller may control or configure the RIS's, AP's, and UE devices to implement the schedule (e.g., via a control radio access technology). The schedule may divide the time, frequency, and/or spatial resources of the RIS(s) to meet the traffic demands of the UE devices at their current locations. For example, one or more of the AP's may serve one or more of the UE devices via one or more of the RIS's using a space division multiple access (SDMA) scheme, a time-division multiple access (TDMA) scheme, a frequency-division multiple access (FDMA) scheme, and/or a distributed multiple-input and multiple output (MIMO) scheme. The schedule may be updated over time as needed. The RIS's may allow for a reduction in the number of AP's required in the system to meet the dynamic traffic demands of the UE devices that happen to be present in the system at any given time, thereby minimizing deployment and operating costs.

An aspect of the disclosure provides a method of operating a wireless access point. The method may include transmitting, using a transmitter, a first stream of wireless data to a first user equipment (UE) device via reflection off a reflective intelligent surface (RIS). The method may include transmitting, using the transmitter, a second stream of wireless data to a second UE device that is different from the first UE device.

An aspect of the disclosure provides a method of operating a reconfigurable intelligent surface (RIS). The method can include reflecting, using one or more antenna elements on the RIS, first radio-frequency signals transmitted by a wireless access point towards a first user equipment (UE) device. The method can include reflecting, using the one or more antenna elements, second radio-frequency signals towards a second UE device that is different from the first UE device.

An aspect of the disclosure provides a method of operating a wireless communications system. The method can include transmitting, at a first wireless access point, first radio-frequency signals towards a first reconfigurable intelligent surface (RIS). The method can include transmitting, using a second wireless access point that is different from the first wireless access point, second radio-frequency signals towards a second RIS that is different from the first RIS concurrent with transmission of the first radio-frequency signals by the first wireless access point. The method can include reflecting, using the first RIS, the first radio-frequency signals towards a user equipment (UE) device. The method can include reflecting, using the second RIS, the second radio-frequency signals towards the UE device concurrent with reflection of the first radio-frequency signals by the first RIS.

DETAILED DESCRIPTION

Figure 1:
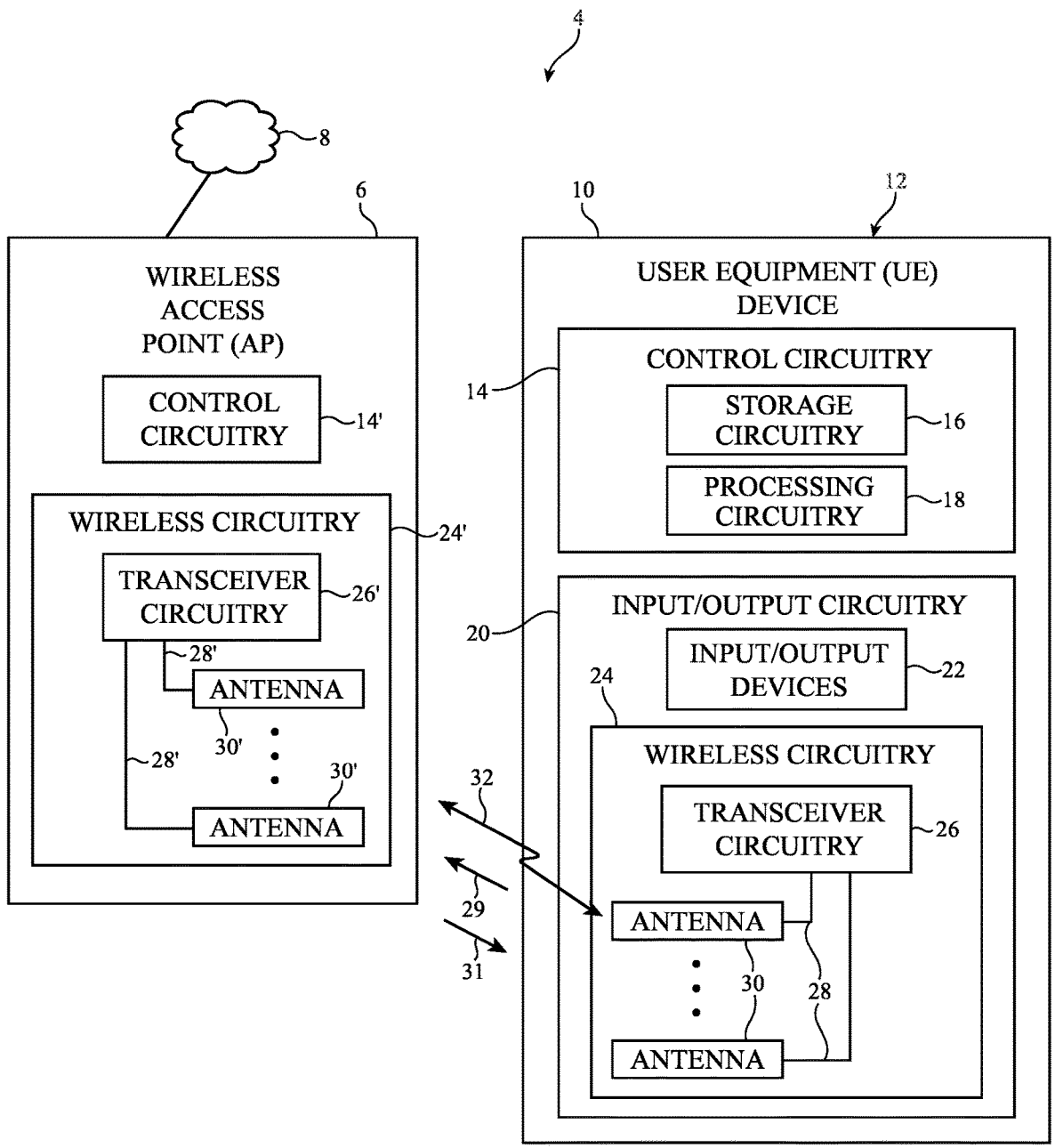
FIG. 1 is a schematic block diagram of an illustrative wireless access point and user equipment device that wirelessly communicate at frequencies greater than about 100 GHz in accordance with some embodiments.

FIG. 1 is a schematic diagram of an illustrative communications system 4 (sometimes referred to herein as communications network 4) for conveying wireless data between communications terminals. Communications system 4 may include network nodes (e.g., communications terminals). The network nodes may include user equipment (UE) such as one or more UE devices 10. The network nodes may also include external communications equipment (e.g., communications equipment other than UE devices such as external communications equipment 6. External communications equipment 6 may include one or more electronic devices and may be a wireless base station, wireless access point, or other wireless equipment for example. Implementations in which external communications equipment 6 is a wireless access point are described herein as an example. External communications equipment 6 may therefore sometimes be referred to herein as wireless access point 6 or simply as access point (AP) 6. UE devices and AP 6 may communicate with each other using one or more wireless communications links If desired, UE devices 10 may wirelessly communicate with AP 6 without passing communications through any other intervening network nodes in communications system 4 (e.g., UE devices 10 may communicate directly with AP 6 over-the-air).

AP 6 may be communicably coupled to a larger communications network 8 via wired and/or wireless links. The larger communications network may include one or more wired communications links (e.g., communications links formed using cabling such as ethernet cables, radio-frequency cables such as coaxial cables or other transmission lines, optical fibers or other optical cables, etc.), one or more wireless communications links (e.g., short range wireless communications links that operate over a range of inches, feet, or tens of feet, medium range wireless communications links that operate over a range of hundreds of feet, thousands of feet, miles, or tens of miles, and/or long range wireless communications links that operate over a range of hundreds or thousands of miles, etc.), communications gateways, wireless access points, base stations, switches, routers, servers, modems, repeaters, telephone lines, network cards, line cards, portals, user equipment (e.g., computing devices, mobile devices, etc.), etc. The larger communications network may include communications (network) nodes or terminals coupled together using these components or other components (e.g., some or all of a mesh network, relay network, ring network, local area network, wireless local area network, personal area network, cloud network, star network, tree network, or networks of communications nodes having other network topologies), the Internet, combinations of these, etc. UE devices 10 may send data to and/or may receive data from other nodes or terminals in the larger communications network via AP 6 (e.g., AP 6 may serve as an interface between user equipment devices 10 and the rest of the larger communications network).

User equipment (UE) device 10 of FIG. 1 is an electronic device (sometimes referred to herein as electronic device 10, device 10, or electro-optical device 10) and may be a computing device such as a laptop computer, a desktop computer, a computer monitor containing an embedded computer, a tablet computer, a cellular telephone, a media player, or other handheld or portable electronic device, a smaller device such as a wristwatch device, a pendant device, a headphone or earpiece device, a device embedded in eyeglasses, goggles, or other equipment worn on a user's head, or other wearable or miniature device, a television, a computer display that does not contain an embedded computer, a gaming device, a navigation device, an embedded system such as a system in which electronic equipment with a display is mounted in a kiosk or automobile, a wireless internet-connected voice-controlled speaker, a home entertainment device, a remote control device, a gaming controller, a peripheral user input device, a wireless base station or access point, equipment that implements the functionality of two or more of these devices, or other electronic equipment.

As shown in the functional block diagram of FIG. 1, UE device 10 may include components located on or within an electronic device housing such as housing 12. Housing 12, which may sometimes be referred to as a case, may be formed of plastic, glass, ceramics, fiber composites, metal (e.g., stainless steel, aluminum, metal alloys, etc.), other suitable materials, or a combination of these materials. In some situations, part or all of housing 12 may be formed from dielectric or other low-conductivity material (e.g., glass, ceramic, plastic, sapphire, etc.). In other situations, housing 12 or at least some of the structures that make up housing 12 may be formed from metal elements.

UE device 10 may include control circuitry 14. Control circuitry 14 may include storage such as storage circuitry 16. Storage circuitry 16 may include hard disk drive storage, nonvolatile memory (e.g., flash memory or other electrically-programmable-read-only memory configured to form a solid-state drive), volatile memory (e.g., static or dynamic random-access-memory), etc. Storage circuitry 16 may include storage that is integrated within device 10 and/or removable storage media.

Control circuitry 14 may include processing circuitry such as processing circuitry 18. Processing circuitry 18 may be used to control the operation of device 10. Processing circuitry 18 may include on one or more processors, microprocessors, microcontrollers, digital signal processors, host processors, baseband processor integrated circuits, application specific integrated circuits, central processing units (CPUs), graphics processing units (GPUs), etc. Control circuitry 14 may be configured to perform operations in device 10 using hardware (e.g., dedicated hardware or circuitry), firmware, and/or software. Software code for performing operations in device 10 may be stored on storage circuitry 16 (e.g., storage circuitry 16 may include non-transitory (tangible) computer readable storage media that stores the software code). The software code may sometimes be referred to as program instructions, software, data, instructions, or code. Software code stored on storage circuitry 16 may be executed by processing circuitry 18.

Control circuitry 14 may be used to run software on device 10 such as satellite navigation applications, internet browsing applications, voice-over-internet-protocol (VOIP) telephone call applications, email applications, media playback applications, operating system functions, etc. To support interactions with external equipment, control circuitry 14 may be used in implementing communications protocols. Communications protocols that may be implemented using control circuitry 14 include internet protocols, wireless local area network (WLAN) protocols (e.g., IEEE 802.11 protocols—sometimes referred to as Wi-Fi®), protocols for other short-range wireless communications links such as the Bluetooth® protocol or other wireless personal area network (WPAN) protocols, IEEE 802.11ad protocols (e.g., ultra-wideband protocols), cellular telephone protocols (e.g., 3G protocols, 4G (LTE) protocols, 3GPP Fifth Generation (5G) New Radio (NR) protocols, Sixth Generation (6G) protocols, sub-THz protocols, THz protocols, etc.), antenna diversity protocols, satellite navigation system protocols (e.g., global positioning system (GPS) protocols, global navigation satellite system (GLONASS) protocols, etc.), antenna-based spatial ranging protocols, optical communications protocols, or any other desired communications protocols. Each communications protocol may be associated with a corresponding radio access technology (RAT) that specifies the physical connection methodology used in implementing the protocol.

UE device 10 may include input-output circuitry 20. Input-output circuitry 20 may include input-output devices 22. Input-output devices 22 may be used to allow data to be supplied to UE device 10 and to allow data to be provided from UE device 10 to external devices. Input-output devices 22 may include user interface devices, data port devices, and other input-output components. For example, input-output devices 22 may include touch sensors, displays (e.g., touch-sensitive and/or force-sensitive displays), light-emitting components such as displays without touch sensor capabilities, buttons (mechanical, capacitive, optical, etc.), scrolling wheels, touch pads, key pads, keyboards, microphones, cameras, buttons, speakers, status indicators, audio jacks and other audio port components, digital data port devices, motion sensors (accelerometers, gyroscopes, and/or compasses that detect motion), capacitance sensors, proximity sensors, magnetic sensors, force sensors (e.g., force sensors coupled to a display to detect pressure applied to the display), temperature sensors, etc. In some configurations, keyboards, headphones, displays, pointing devices such as trackpads, mice, and joysticks, and other input-output devices may be coupled to UE device 10 using wired or wireless connections (e.g., some of input-output devices 22 may be peripherals that are coupled to a main processing unit or other portion of UE device 10 via a wired or wireless link).

Input-output circuitry 20 may include wireless circuitry 24 to support wireless communications. Wireless circuitry 24 (sometimes referred to herein as wireless communications circuitry 24) may include one or more antennas 30.

Wireless circuitry 24 may also include transceiver circuitry 26. Transceiver circuitry 26 may include transmitter circuitry, receiver circuitry, modulator circuitry, demodulator circuitry (e.g., one or more modems), radio-frequency circuitry, one or more radios, intermediate frequency circuitry, optical transmitter circuitry, optical receiver circuitry, optical light sources, other optical components, baseband circuitry (e.g., one or more baseband processors), amplifier circuitry, clocking circuitry such as one or more local oscillators and/or phase-locked loops, memory, one or more registers, filter circuitry, switching circuitry, analog-to-digital converter (ADC) circuitry, digital-to-analog converter (DAC) circuitry, radio-frequency transmission lines, optical fibers, and/or any other circuitry for transmitting and/or receiving wireless signals using antennas 30. The components of transceiver circuitry 26 may be implemented on one integrated circuit, chip, system-on-chip (SOC), die, printed circuit board, substrate, or package, or the components of transceiver circuitry 26 may be distributed across two or more integrated circuits, chips, SOCs, printed circuit boards, substrates, and/or packages.

The example of FIG. 1 is illustrative and non-limiting. While control circuitry 14 is shown separately from wireless circuitry 24 in the example of FIG. 1 for the sake of clarity, wireless circuitry 24 may include processing circuitry (e.g., one or more processors) that forms a part of processing circuitry 18 and/or storage circuitry that forms a part of storage circuitry 16 of control circuitry 14 (e.g., portions of control circuitry 14 may be implemented on wireless circuitry 24). As an example, control circuitry 14 may include baseband circuitry (e.g., one or more baseband processors), digital control circuitry, analog control circuitry, and/or other control circuitry that forms part of wireless circuitry 24. The baseband circuitry may, for example, access a communication protocol stack on control circuitry 14 (e.g., storage circuitry 16) to: perform user plane functions at a PHY layer, MAC layer, RLC layer, PDCP layer, SDAP layer, and/or PDU layer, and/or to perform control plane functions at the PHY layer, MAC layer, RLC layer, PDCP layer, RRC, layer, and/or non-access stratum layer.

Transceiver circuitry 26 may be coupled to each antenna 30 in wireless circuitry 24 over a respective signal path 28. Each signal path 28 may include one or more radio-frequency transmission lines, waveguides, optical fibers, and/or any other desired lines/paths for conveying wireless signals between transceiver circuitry 26 and antenna 30. Antennas 30 may be formed using any desired antenna structures for conveying wireless signals. For example, antennas 30 may include antennas with resonating elements that are formed from dipole antenna structures, planar dipole antenna structures (e.g., bowtie antenna structures), slot antenna structures, loop antenna structures, patch antenna structures, inverted-F antenna structures, planar inverted-F antenna structures, helical antenna structures, monopole antennas, dipoles, hybrids of these designs, etc. Filter circuitry, switching circuitry, impedance matching circuitry, and/or other antenna tuning components may be adjusted to adjust the frequency response and wireless performance of antennas 30 over time.

If desired, two or more of antennas 30 may be integrated into a phased antenna array (sometimes referred to herein as a phased array antenna or an array of antenna elements) in which each of the antennas conveys wireless signals with a respective phase and magnitude that is adjusted over time so the wireless signals constructively and destructively interfere to produce (form) a signal beam in a given pointing direction. The term "convey wireless signals" as used herein means the transmission and/or reception of the wireless signals (e.g., for performing unidirectional and/or bidirectional wireless communications with external wireless communications equipment). Antennas 30 may transmit the wireless signals by radiating the signals into free space (or to free space through intervening device structures such as a dielectric cover layer). Antennas 30 may additionally or alternatively receive the wireless signals from free space (e.g., through intervening devices structures such as a dielectric cover layer). The transmission and reception of wireless signals by antennas 30 each involve the excitation or resonance of antenna currents on an antenna resonating (radiating) element in the antenna by the wireless signals within the frequency band(s) of operation of the antenna.

Transceiver circuitry 26 may use antenna(s) 30 to transmit and/or receive wireless signals that convey wireless communications data between device 10 and external wireless communications equipment (e.g., one or more other devices such as device 10, a wireless access point or base station, etc.). The wireless communications data may be conveyed bidirectionally or unidirectionally. The wireless communications data may, for example, include data that has been encoded into corresponding data packets such as wireless data associated with a telephone call, streaming media content, internet browsing, wireless data associated with software applications running on device 10, email messages, etc.

Additionally or alternatively, wireless circuitry 24 may use antenna(s) 30 to perform wireless sensing operations. The sensing operations may allow device 10 to detect (e.g., sense or identify) the presence, location, orientation, and/or velocity (motion) of objects external to device 10. Control circuitry 14 may use the detected presence, location, orientation, and/or velocity of the external objects to perform any desired device operations. As examples, control circuitry 14 may use the detected presence, location, orientation, and/or velocity of the external objects to identify a corresponding user input for one or more software applications running on device 10 such as a gesture input performed by the user's hand(s) or other body parts or performed by an external stylus, gaming controller, head-mounted device, or other peripheral devices or accessories, to determine when one or more antennas 30 needs to be disabled or provided with a reduced maximum transmit power level (e.g., for satisfying regulatory limits on radio-frequency exposure), to determine how to steer (form) a radio-frequency signal beam produced by antennas 30 for wireless circuitry 24 (e.g., in scenarios where antennas 30 include a phased array of antennas 30), to map or model the environment around device 10 (e.g., to produce a software model of the room where device 10 is located for use by an augmented reality application, gaming application, map application, home design application, engineering application, etc.), to detect the presence of obstacles in the vicinity of (e.g., around) device 10 or in the direction of motion of the user of device 10, etc. The sensing operations may, for example, involve the transmission of sensing signals (e.g., radar waveforms), the receipt of corresponding reflected signals (e.g., the transmitted waveforms that have reflected off of external objects), and the processing of the transmitted signals and the received reflected signals (e.g., using a radar scheme).

Wireless circuitry 24 may transmit and/or receive wireless signals within corresponding frequency bands of the electromagnetic spectrum (sometimes referred to herein as communications bands or simply as "bands"). The frequency bands handled by wireless circuitry 24 may include wireless local area network (WLAN) frequency bands (e.g., Wi-Fi® (IEEE 802.11) or other WLAN communications bands) such as a 2.4 GHz WLAN band (e.g., from 2400 to 2480 MHz), a 5 GHz WLAN band (e.g., from 5180 to 5825 MHz), a Wi-Fi® 6E band (e.g., from 5925-7125 MHz), and/or other Wi-Fi® bands (e.g., from 1875-5160 MHz), wireless personal area network (WPAN) frequency bands such as the 2.4 GHz Bluetooth® band or other WPAN communications bands, cellular telephone frequency bands (e.g., bands from about 600 MHz to about 5 GHz, 3G bands, 4G LTE bands, 5G New Radio Frequency Range 1 (FR1) bands below 10 GHz, 5G New Radio Frequency Range 2 (ER2) bands between 20 and 60 GHz, 6G bands, etc.), other centimeter or millimeter wave frequency bands between 10-100 GHz, near-field communications frequency bands (e.g., at 13.56 MHz), satellite navigation frequency bands (e.g., a GPS band from 1565 to 1610 MHz, a Global Navigation Satellite System (GLONASS) band, a BeiDou Navigation Satellite System (BDS) band, etc.), ultra-wideband (UWB) frequency bands that operate under the IEEE 802.15.4 protocol and/or other ultra-wideband communications protocols, communications bands under the family of 3GPP wireless communications standards, communications bands under the IEEE 802.XX family of standards, and/or any other desired frequency bands of interest.

Over time, software applications on electronic devices such as device 10 have become more and more data intensive. Wireless circuitry on the electronic devices therefore needs to support data transfer at higher and higher data rates. In general, the data rates supported by the wireless circuitry are proportional to the frequency of the wireless signals conveyed by the wireless circuitry (e.g., higher frequencies can support higher data rates than lower frequencies). Wireless circuitry 24 may convey centimeter and millimeter wave signals to support relatively high data rates (e.g., because centimeter and millimeter wave signals are at relatively high frequencies between around 10 GHz and 100 GHz). However, the data rates supported by centimeter and millimeter wave signals may still be insufficient to meet all the data transfer needs of device 10. To support even higher data rates such as data rates up to 5-100 Gbps or higher, wireless circuitry 24 may convey wireless signals at frequencies greater than about 100 GHz.

As shown in FIG. 1, wireless circuitry 24 may transmit wireless signals 32 and/or may receive wireless signals 32 at frequencies greater than around 100 GHz (e.g., greater than 70 GHz, 80 GHz, 90 GHz, 110 GHz, etc.). Wireless signals 32 may sometimes be referred to herein as tremendously high frequency (THF) signals 32, sub-THz signals 32, THz signals 32, or sub-millimeter wave signals 32. THF signals 32 may be at sub-THz or THz frequencies such as frequencies between 100 GHz and 1 THz, between 80 GHz and 10 THz, between 100 GHz and 10 THz, between 100 GHz and 2 THz, between 200 GHz and 1 THz, between 300 GHz and 1 THz, between 300 GHz and 2 THz, between 70 GHz and 2 THz, between 300 GHz and 10 THz, between 100 GHz and 800 GHz, between 200 GHz and 1.5 THz, etc. (e.g., within a sub-THz, THz, THF, or sub-millimeter frequency band such as a 6G frequency band). The high data rates supported by these frequencies may be leveraged by device 10 to perform cellular telephone voice and/or data communications (e.g., while supporting spatial multiplexing to provide further data bandwidth), to perform spatial ranging operations such as radar operations to detect the presence, location, and/or velocity of objects external to device 10, to perform automotive sensing (e.g., with enhanced security), to perform health/body monitoring on a user of device 10 or another person, to perform gas or chemical detection, to form a high data rate wireless connection between device 10 and another device or peripheral device (e.g., to form a high data rate connection between a display driver on device 10 and a display that displays ultra-high resolution video), to form a remote radio head (e.g., a flexible high data rate connection), to form a THF chip-to-chip connection within device 10 that supports high data rates (e.g., where one antenna 30 on a first chip in device 10 transmits THF signals 32 to another antenna 30 on a second chip in device 10), and/or to perform any other desired high data rate operations.

Space is at a premium within electronic devices such as device 10. In some scenarios, different antennas 30 are used to transmit THF signals 32 than are used to receive THF signals 32. However, handling transmission of THF signals 32 and reception of THF signals 32 using different antennas 30 can consume an excessive amount of space and other resources within device 10 because two antennas 30 and signal paths 28 would be required to handle both transmission and reception. To minimize space and resource consumption within device 10, the same antenna 30 and signal path 28 may be used to both transmit THF signals 32 and to receive THF signals 32. If desired, multiple antennas 30 in wireless circuitry 24 may transmit THF signals 32 and may receive THF signals 32. The antennas may be integrated into a phased antenna array that transmits THF signals 32 and that receives THF signals 32 within a corresponding signal beam oriented in a selected beam pointing direction.

As shown in FIG. 1, AP 6 may also include control circuitry 14' (e.g., control circuitry having similar components and/or functionality as control circuitry 14 in UE device 10) and wireless circuitry 24' (e.g., wireless circuitry having similar components and/or functionality as wireless circuitry 24' in UE device 10). Wireless circuitry 24' may include transceiver circuitry 26' (e.g., transceiver circuitry having similar components and/or functionality as transceiver circuitry 26 in UE device 10) coupled to two or more antennas 30' (e.g., antennas having similar components and/or functionality as antennas 30 in UE device 10) over corresponding signal paths 28' (e.g., signal paths having similar components and/or functionality as signal paths 28 in UE device 10). Antennas 30' may be arranged in one or more phased antenna arrays. AP 6 may use wireless circuitry 24' to transmit THF signals 32 to UE device 10 (e.g., as downlink (DL) signals transmitted in downlink direction 31) and/or to receive THF signals 32 transmitted by UE device 10 (e.g., as uplink (UL) signals transmitted in uplink direction 29).

It can be challenging to incorporate components into wireless circuitry 24 and 24' that support wireless communications at these high frequencies. If desired, transceiver circuitry 26 and 26' and signal paths 28 and 28' may include optical components that convey optical signals to support the transmission and reception of THF signals 32 in a space and resource-efficient manner The optical signals may be used in transmitting THF signals 32 at THF frequencies and/or in receiving THF signals 32 at THF frequencies.

Figure 2:
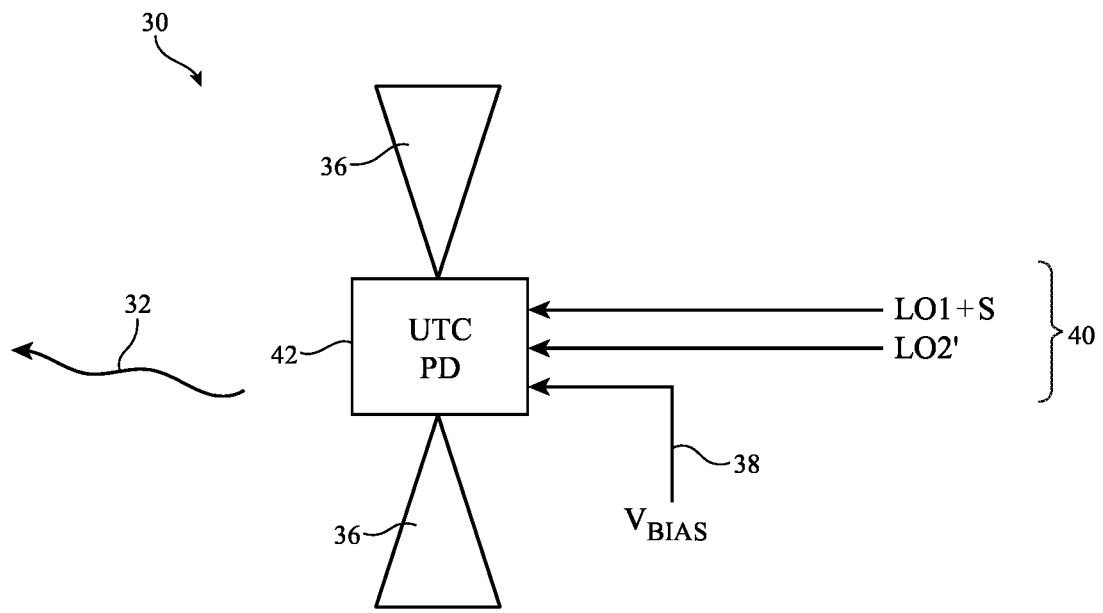
FIG. 2 is a top view of an illustrative antenna that transmits wireless signals at frequencies greater than about 100 GHz based on optical local oscillator (LO) signals in accordance with some embodiments.

FIG. 2 is a diagram of an illustrative antenna 30 that may be used to both transmit THF signals 32 and to receive THF signals 32 in examples where AP 6 is an electro-optical device that conveys THF signals 32 using optical signals. This is illustrative and non-limiting. In particular, FIGS. 2-7 illustrate one exemplary implementation for how antenna 30 (or antenna 30' in AP 6) may convey THF signals 32 using optical signals (e.g., in an example where UE device 10 and/or AP 6 are electro-optical devices). This is illustrative and, in general, UE device 10 and AP 6 may generate and convey THF signals using any desired array architecture(s) (e.g., where antenna 30 is fed using one or more transmission lines and one or more phase and magnitude controllers). AP 6 and UE device 10 need not be electro-optical devices. Antenna 30 may include one or more antenna radiating (resonating) elements 36 such as radiating (resonating) element arms. In the example of FIG. 2, antenna 30 is a planar dipole antenna (sometimes referred to as a "bowtie" antenna) having an antenna resonating element 36 with two opposing resonating element arms (e.g., bowtie arms or dipole arms). This is illustrative and, in general, antenna 30 may be any type of antenna having any desired antenna radiating element architecture.

As shown in FIG. 2 (e.g., in implementations where UE device 10 or AP 6 is an electro-optical device), antenna 30 includes a photodiode (PD) 42 coupled between the arms of antenna resonating element 36. Electronic devices that include antennas 30 with photodiodes 42 such as device 10 may sometimes also be referred to as electro-optical devices. Photodiode 42 may be a programmable photodiode. An example in which photodiode 42 is a programmable uni-travelling-carrier photodiode (UTC PD) is described herein as an example. Photodiode 42 may therefore sometimes be referred to herein as UTC PD 42 or programmable UTC PD 42. This is illustrative and, in general, photodiode 42 may include any desired type of adjustable/programmable photodiode or component that converts electromagnetic energy at optical frequencies to current at THF frequencies on antenna resonating element 36 and/or vice versa (e.g., a p-i-n diode, a tunneling diode, a TW UTC photodiode, other diodes with quadratic characteristics, an LT-GaAs photodiode, an M-UTC photodiode, etc.). Each radiating element arm in antenna resonating element 36 may, for example, have a first edge at UTC PD 42 and a second edge opposite the first edge that is wider than the first edge (e.g., in implementations where antenna 30 is a bowtie antenna). Other radiating elements may be used if desired.

UTC PD 42 may have a bias terminal (input) 38 that receives one or more control signals $V_{BIAS}$. Control signals $V_{BIAS}$ may include bias voltages provided at one or more voltage levels and/or other control signals for controlling the operation of UTC PD 42 such as impedance adjustment control signals for adjusting the output impedance of UTC PD 42. Control circuitry 14 (FIG. 1) may provide (e.g., apply, supply, assert, etc.) control signals $V_{BIAS}$ at different settings (e.g., values, magnitudes, etc.) to dynamically control (e.g., program or adjust) the operation of UTC PD 42 over time. For example, control signals $V_{BIAS}$ may be used to control whether antenna 30 transmits THF signals 32 or receives THF signals 32. When control signals $V_{BIAS}$ include a bias voltage asserted at a first level or magnitude, antenna 30 may be configured to transmit THF signals 32. When control signals $V_{BIAS}$ include a bias voltage asserted at a second level or magnitude, antenna 30 may be configured to receive THF signals 32. In the example of FIG. 2, control signals $V_{BIAS}$ include the bias voltage asserted at the first level to configure antenna 30 to transmit THF signals 32. If desired, control signals $V_{BIAS}$ may also be adjusted to control the waveform of the THF signals (e.g., as a squaring function that preserves the modulation of incident optical signals, a linear function, etc.), to perform gain control on the signals conveyed by antenna 30, and/or to adjust the output impedance of UTC PD 42.

As shown in FIG. 2 (e.g., in implementations where UE device 10 or AP 6 is an electro-optical device), UTC PD 42 may be optically coupled to optical path 40. Optical path 40 may include one or more optical fibers or waveguides. UTC PD 42 may receive optical signals from transceiver circuitry 26 (FIG. 1) over optical path 40. The optical signals may include a first optical local oscillator (LO) signal LO1 and a second optical local oscillator signal LO2. Optical local oscillator signals LO1 and LO2 may be generated by light sources in transceiver circuitry 26 (FIG. 1). Optical local oscillator signals LO1 and LO2 may be at optical wavelengths (e.g., between 400 nm and 700 nm), ultra-violet wavelengths (e.g., near-ultra-violet or extreme ultraviolet wavelengths), and/or infrared wavelengths (e.g., near-infrared wavelengths, mid-infrared wavelengths, or far-infrared wavelengths). Optical local oscillator signal LO2 may be offset in wavelength from optical local oscillator signal LO1 by a wavelength offset X. Wavelength offset X may be equal to the wavelength of the THF signals conveyed by antenna 30 (e.g., between 100 GHz and 1 THz (1000 GHz), between 100 GHz and 2 THz, between 300 GHz and 800 GHz, between 300 GHz and 1 THz, between 300 and 400 GHz, etc.).

During signal transmission, wireless data (e.g., wireless data packets, symbols, frames, etc.) may be modulated onto optical local oscillator signal LO2 to produce modulated optical local oscillator signal LO2'. If desired, optical local oscillator signal LO1 may be provided with an optical phase shift S. Optical path 40 may illuminate UTC PD 42 with optical local oscillator signal LO1 (plus the optical phase shift S when applied) and modulated optical local oscillator signal LO2'. If desired, lenses or other optical components may be interposed between optical path 40 and UTC PD 42 to help focus the optical local oscillator signals onto UTC PD 42.

UTC PD 42 may convert optical local oscillator signal LO1 and modulated local oscillator signal LO2' (e.g., beats between the two optical local oscillator signals) into antenna currents that run along the perimeter of the radiating element arms in antenna resonating element 36. The frequency of the antenna current is equal to the frequency difference between local oscillator signal LO1 and modulated local oscillator signal LO2'. The antenna currents may radiate (transmit) THF signals 32 into free space. Control signal $V_{BIAS}$ may control UTC PD 42 to convert the optical local oscillator signals into antenna currents on the radiating element arms in antenna resonating element 36 while preserving the modulation and thus the wireless data on modulated local oscillator signal LO2' (e.g., by applying a squaring function to the signals). THF signals 32 will thereby carry the modulated wireless data for reception and demodulation by external wireless communications equipment.

Figure 3:
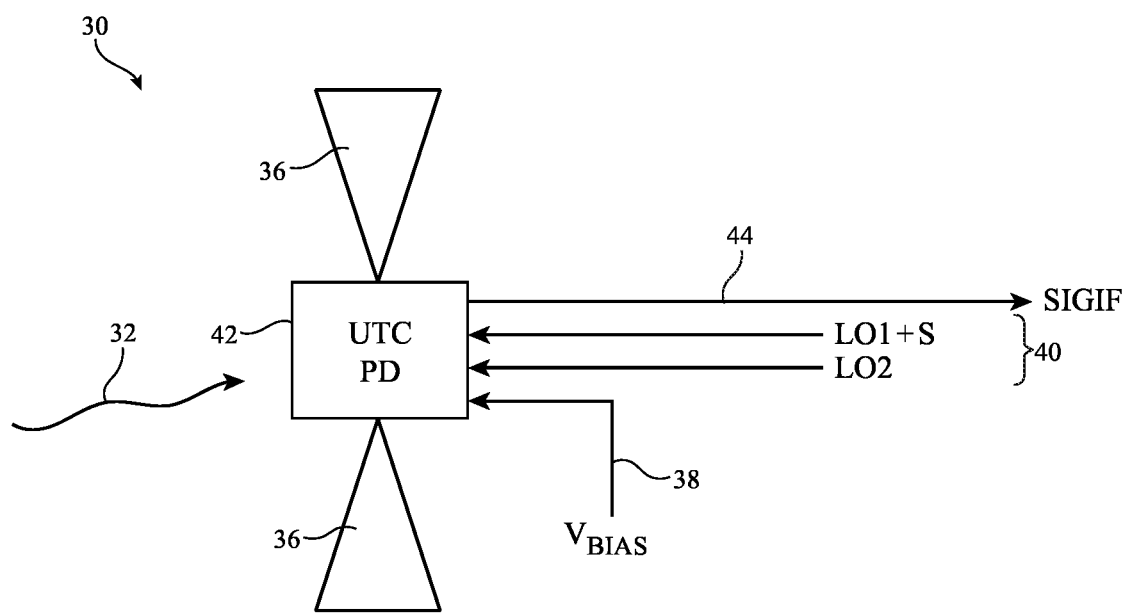
FIG. 3 is a top view showing how an illustrative antenna of the type shown in FIG. 2 may convert received wireless signals at frequencies greater than about 100 GHz into intermediate frequency signals based on optical LO signals in accordance with some embodiments.

FIG. 3 is a diagram showing how antenna 30 may receive THF signals 32 (e.g., after changing the setting of control signals $V_{BIAS}$ into a reception state from the transmission state of FIG. 2, in implementations where UE device 10 or AP 6 is an electro-optical device). As shown in FIG. 3, THF signals 32 may be incident upon the antenna radiating element arms of antenna resonating element 36. The incident THF signals 32 may produce antenna currents that flow around the perimeter of the radiating element arms in antenna resonating element 36. UTC PD 42 may use optical local oscillator signal LO1 (plus the optical phase shift S when applied), optical local oscillator signal LO2 (e.g., without modulation), and control signals $V_{BIAS}$ (e.g., a bias voltage asserted at the second level) to convert the received THF signals 32 into intermediate frequency signals SIGIF that are output onto intermediate frequency signal path 44.

The frequency of intermediate frequency signals SIGIF may be equal to the frequency of THF signals 32 minus the difference between the frequency of optical local oscillator signal LO1 and the frequency of optical local oscillator signal LO2. As an example, intermediate frequency signals SIGIF may be at lower frequencies than THF signals such as centimeter or millimeter wave frequencies between 10 GHz and 100 GHz, between 30 GHz and 80 GHz, around 60 GHz, etc. If desired, transceiver circuitry 26 (FIG. 1) may change the frequency of optical local oscillator signal LO1 and/or optical local oscillator signal LO2 when switching from transmission to reception or vice versa. UTC PD 42 may preserve the data modulation of THF signals 32 in intermediate signals SIGIF. A receiver in transceiver circuitry 26 (FIG. 1) may demodulate intermediate frequency signals SIGIF (e.g., after further downconversion) to recover the wireless data from THF signals 32. In another example, wireless circuitry 24 may convert intermediate frequency signals SIGIF to the optical domain before recovering the wireless data. In yet another example, intermediate frequency signal path 44 may be omitted and UTC PD 42 may convert THF signals 32 into the optical domain for subsequent demodulation and data recovery (e.g., in a sideband of the optical signal).

Figure 4:
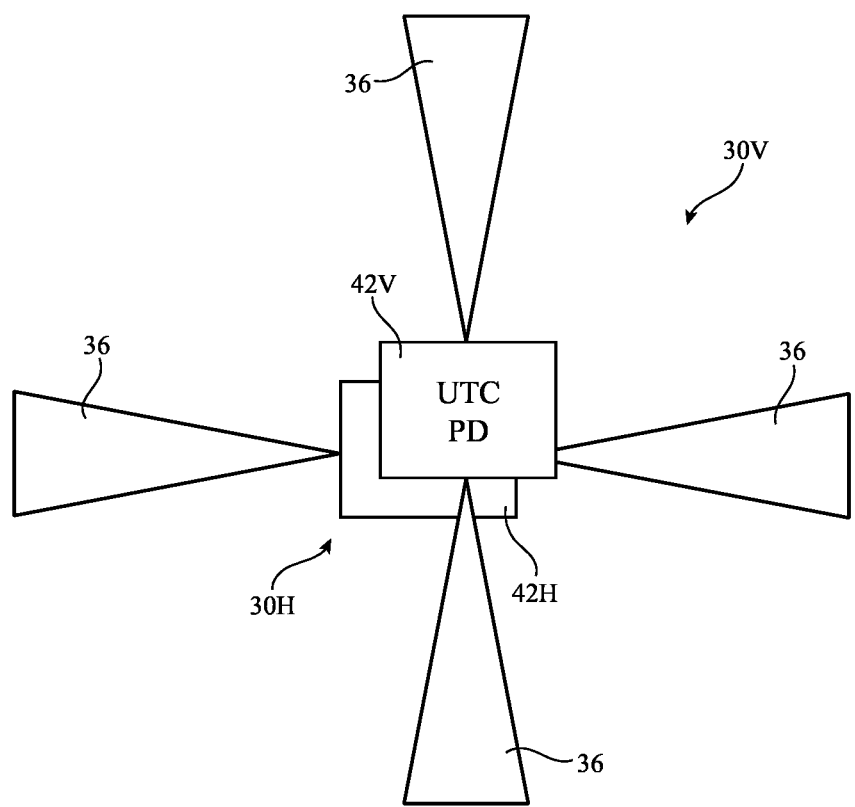
FIG. 4 is a top view showing how multiple antennas of the type shown in FIGS. 2 and 3 may be stacked to cover multiple polarizations in accordance with some embodiments.

While FIGS. 2 and 3 show an illustrative antenna 30 from UE device 10, similar structures may additionally or alternatively be used to form antenna 30' on AP 6 (e.g., where antenna 30' conveys signals for transceiver circuitry 26' in wireless circuitry 24' of FIG. 1 instead of for transceiver circuitry 26 in wireless circuitry 24 as described in connection with FIGS. 2 and 3). The antenna 30 of FIGS. 2 and 3 may support transmission of THF signals 32 and reception of THF signals 32 with a given polarization (e.g., a linear polarization such as a vertical polarization). If desired, wireless circuitry 24 and/or 24' (FIG. 1) may include multiple antennas 30 and/or 30' for covering different polarizations. FIG. 4 is a diagram showing one example of how wireless circuitry 24 in UE device 10 may include multiple antennas 30 for covering different polarizations. While FIGS. 4 shows illustrative antennas 30 from UE device 10, similar structures may additionally or alternatively be used to form antenna 30' on AP 6.

As shown in FIG. 4, the wireless circuitry may include a first antenna 30 such as antenna 30V for covering a first polarization (e.g., a first linear polarization such as a vertical polarization) and may include a second antenna 30 such as antenna 30H for covering a second polarization different from or orthogonal to the first polarization (e.g., a second linear polarization such as a horizontal polarization). Antenna 30V may have a UTC PD 42 such as UTC PD 42V coupled between a corresponding pair of radiating element arms in antenna resonating element 36. Antenna 30H may have a UTC PD 42 such as UTC PD 42H coupled between a corresponding pair of radiating element arms in antenna resonating element 36 oriented non-parallel (e.g., orthogonal) to the radiating element arms in antenna resonating element 36 of antenna 30V. This may allow antennas 30V and 30H to transmit THF signals 32 with respective (orthogonal) polarizations and may allow antennas 30V and 30H to receive THF signals 32 with respective (orthogonal) polarizations.

To minimize space within device 10, antenna 30V may be vertically stacked over or under antenna 30H (e.g., where UTC PD 42V partially or completely overlaps UTC PD 42H). In this example, antennas 30V and 30H may both be formed on the same substrate such as a rigid or flexible printed circuit board. The substrate may include multiple stacked dielectric layers (e.g., layers of ceramic, epoxy, flexible printed circuit board material, rigid printed circuit board material, etc.). The antenna resonating element 36 in antenna 30V may be formed on a separate layer of the substrate than the antenna resonating element 36 in antenna 30H or the antenna resonating element 36 in antenna 30V may be formed on the same layer of the substrate as the antenna resonating element 36 in antenna 30H. UTC PD 42V may be formed on the same layer of the substrate as UTC PD 42H or UTC PD 42V may be formed on a separate layer of the substrate than UTC PD 42H. UTC PD 42V may be formed on the same layer of the substrate as the antenna resonating element 36 in antenna 30V or may be formed on a separate layer of the substrate as the antenna resonating element 36 in antenna 30V. UTC PD 42H may be formed on the same layer of the substrate as the antenna resonating element 36 in antenna 30H or may be formed on a separate layer of the substrate as the antenna resonating element 36 in antenna 30H.

Figure 5:
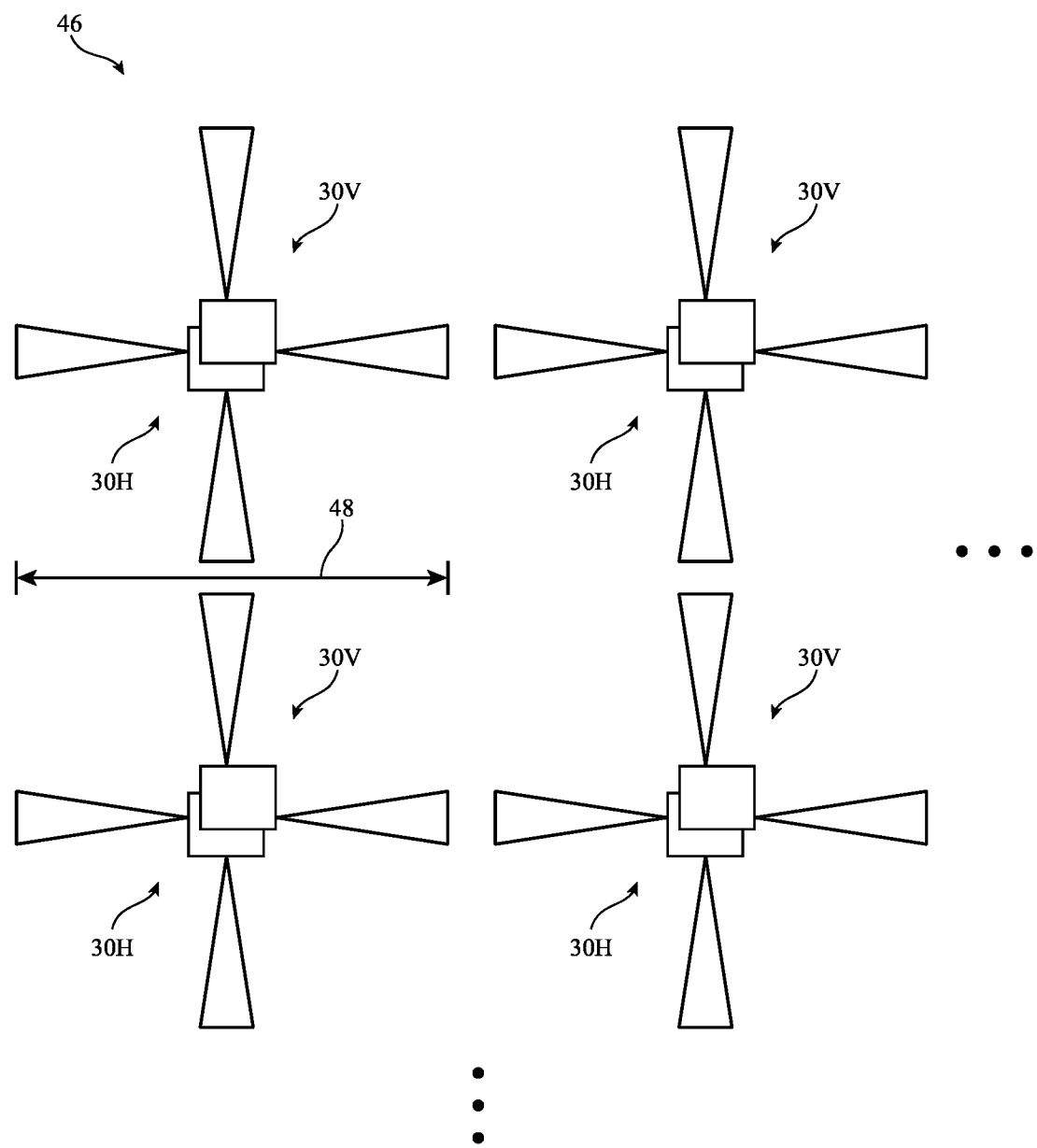
FIG. 5 is a top view showing how stacked antennas of the type shown in FIG. 4 may be integrated into a phased antenna array for conveying wireless signals at frequencies greater than about 100 GHz within a corresponding signal beam.

If desired, antennas 30 or antennas 30H and 30V of FIG. 4 may be integrated within a phased antenna array. FIG. 5 is a diagram showing one example of how antennas 30H and 30V may be integrated within a phased antenna array. As shown in FIG. 5, UE device 10 may include a phased antenna array 46 of stacked antennas 30H and 30V arranged in a rectangular grid of rows and columns. Each of the antennas in phased antenna array 46 may be formed on the same substrate. This is illustrative and non-limiting. In general, phased antenna array 46 may include any desired number of antennas 30V and 30H (or non-stacked antennas 30) arranged in any desired pattern. Each of the antennas in phased antenna array 46 may be provided with a respective optical phase shift S (FIGS. 2 and 3) that configures the antennas to collectively transmit THF signals 32 and/or receive THF signals 32 that sum to form a signal beam of THF signals in a desired beam pointing direction. The beam pointing direction may be selected to point the signal beam towards external communications equipment, towards a desired external object, away from an external object, etc. Phased antenna array 46 may also sometimes be referred to herein as an array of antenna elements (e.g., where each antenna 30V and each antenna 30H or the antenna radiating elements thereof forms a respective antenna element in the array of antenna elements).

Phased antenna array 46 may occupy relatively little space within device 10. For example, each antenna 30V/30H may have a length 48 (e.g., as measured from the end of one radiating element arm to the opposing end of the opposite radiating element arm). Length 48 may be approximately equal to one-half the wavelength of THF signals 32. For example, length 48 may be as small as 0.5 mm or less. Each UTC-PD 42 in phased antenna array 46 may occupy a lateral area of 100 square microns or less. This may allow phased antenna array 46 to occupy very little area within UE device 10, thereby allowing the phased antenna array to be integrated within different portions of device 10 while still allowing other space for device components. While FIG. 5 shows an illustrative phased antenna array that may be formed in UE device 10, similar structures may additionally or alternatively be used to form a phased antenna array on AP 6 (e.g., using antennas 30' of FIG. 1). The examples of FIGS. 2-5 are illustrative and, in general, each antenna may have any desired antenna radiating element architecture.

Figure 6:
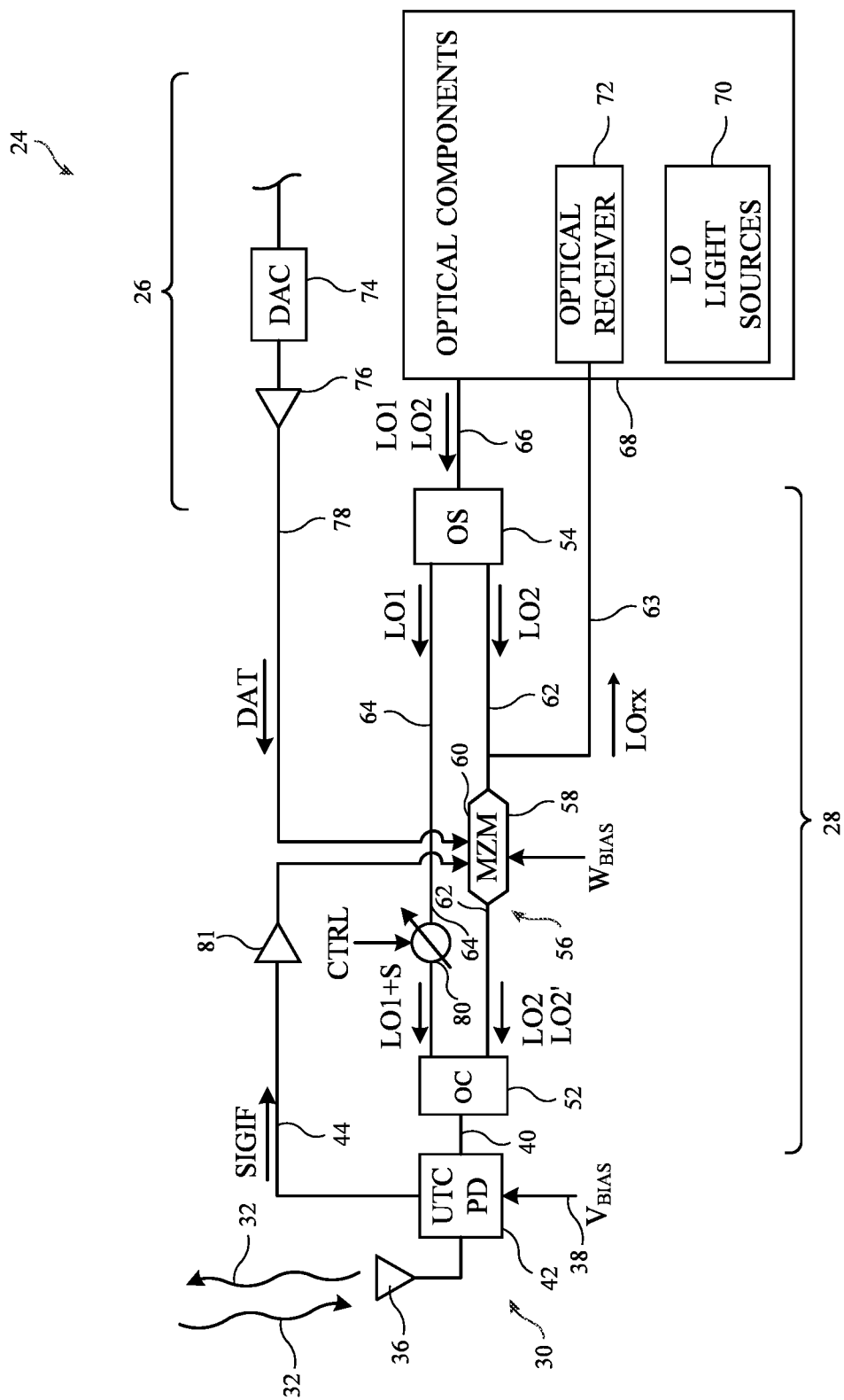
FIG. 6 is a circuit diagram of illustrative wireless circuitry having an antenna that transmits wireless signals at frequencies greater than about 100 GHz and that receives wireless signals at frequencies greater than about 100 GHz for conversion to intermediate frequencies and then to the optical domain in accordance with some embodiments.

FIG. 6 is a circuit diagram showing how a given antenna 30, signal path 28, and transceiver circuitry 26 may be used to both transmit THF signals 32 and receive THF signals 32 based on optical local oscillator signals. While FIG. 6 illustrates an antenna 30, signal path 28, and transceiver circuitry 26 from UE device 10, similar structures may additionally or alternatively be used to form antenna 30', signal path 28', and transceiver circuitry 26, respectively, on AP 6 (FIG. 1). In the example of FIG. 6, UTC PD 42 converts received THF signals 32 into intermediate frequency signals SIGIF that are then converted to the optical domain for recovering the wireless data from the received THF signals.

As shown in FIG. 6, wireless circuitry 24 may include transceiver circuitry 26 coupled to antenna 30 over signal path 28 (e.g., an optical signal path sometimes referred to herein as optical signal path 28). UTC PD 42 may be coupled between the radiating element arm(s) in antenna resonating element 36 of antenna 30 and signal path 28. Transceiver circuitry 26 may include optical components 68, amplifier circuitry such as power amplifier 76, and digital-to-analog converter (DAC) 74. Optical components 68 may include an optical receiver such as optical receiver 72 and optical local oscillator (LO) light sources (emitters) 70. LO light sources 70 may include two or more light sources such as laser light sources, laser diodes, optical phase locked loops, or other optical emitters that emit light (e.g., optical local oscillator signals LO1 and LO2) at respective wavelengths. If desired, LO light sources 70 may include a single light source and may include optical components for splitting the light emitted by the light source into different wavelengths. Signal path 28 may be coupled to optical components 68 over optical path 66. Optical path 66 may include one or more optical fibers and/or waveguides.

Signal path 28 may include an optical splitter such as optical splitter (OS) 54, optical paths such as optical path 64 and optical path 62, an optical combiner such as optical combiner (OC) 52, and optical path 40. Optical path 62 may be an optical fiber or waveguide. Optical path 64 may be an optical fiber or waveguide. Optical splitter 54 may have a first (e.g., input) port coupled to optical path 66, a second (e.g., output) port coupled to optical path 62, and a third (e.g., output) port coupled to optical path 64. Optical path 64 may couple optical splitter 54 to a first (e.g., input) port of optical combiner 52. Optical path 62 may couple optical splitter 54 to a second (e.g., input) port of optical combiner 52. Optical combiner 52 may have a third (e.g., output) port coupled to optical path 40.

An optical phase shifter such as optical phase shifter 80 may be (optically) interposed on or along optical path 64. An optical modulator such as optical modulator 56 may be (optically) interposed on or along optical path 62. Optical modulator 56 may be, for example, a Mach-Zehnder modulator (MZM) and may therefore sometimes be referred to herein as MZM 56. MZM 56 includes a first optical arm (branch) 60 and a second optical arm (branch) 58 interposed in parallel along optical path 62. Propagating optical local oscillator signal LO2 along arms 60 and 58 of MZM 56 may, in the presence of a voltage signal applied to one or both arms, allow different optical phase shifts to be imparted on each arm before recombining the signal at the output of the MZM (e.g., where optical phase modulations produced on the arms are converted to intensity modulations at the output of MZM 56). When the voltage applied to MZM 56 includes wireless data, MZM 56 may modulate the wireless data onto optical local oscillator signal LO2. If desired, the phase shifting performed at MZM 56 may be used to perform beam forming/steering in addition to or instead of optical phase shifter 80. MZM 56 may receive one or more bias voltages $W_{BIAS}$ (sometimes referred to herein as bias signals $W_{BIAS}$) applied to one or both of arms 58 and 60. Control circuitry 14 (FIG. 1) may provide bias voltage $W_{BIAS}$ with different magnitudes to place MZM 56 into different operating modes (e.g., operating modes that suppress optical carrier signals, operating modes that do not suppress optical carrier signals, etc.).

Intermediate frequency signal path 44 may couple UTC PD 42 to MZM 56 (e.g., arm 60). An amplifier such as low noise amplifier 81 may be interposed on intermediate frequency signal path 44. Intermediate frequency signal path 44 may be used to pass intermediate frequency signals SIGIF from UTC PD 42 to MZM 56. DAC 74 may have an input coupled to up-conversion circuitry, modulator circuitry, and/or baseband circuitry in a transmitter of transceiver circuitry 26. DAC 74 may receive digital data to transmit over antenna 30 and may convert the digital data to the analog domain (e.g., as data DAT). DAC 74 may have an output coupled to transmit data path 78. Transmit data path 78 may couple DAC 74 to MZM 56 (e.g., arm 60). Each of the components along signal path 28 may allow the same antenna 30 to both transmit THF signals 32 and receive THF signals 32 (e.g., using the same components along signal path 28), thereby minimizing space and resource consumption within device 10.

LO light sources 70 may produce (emit) optical local oscillator signals LO1 and LO2 (e.g., at different wavelengths that are separated by the wavelength of THF signals 32). Optical components 68 may include lenses, waveguides, optical couplers, optical fibers, and/or other optical components that direct the emitted optical local oscillator signals LO1 and LO2 towards optical splitter 54 via optical path 66. Optical splitter 54 may split the optical signals on optical path 66 (e.g., by wavelength) to output optical local oscillator signal LO1 onto optical path 64 while outputting optical local oscillator signal LO2 onto optical path 62.

Control circuitry may provide phase control signals CTRL to optical phase shifter 80. Phase control signals CTRL may control optical phase shifter 80 to apply optical phase shift S to the optical local oscillator signal LO1 on optical path 64. Phase shift S may be selected to steer a signal beam of THF signals 32 in a desired pointing direction. Optical phase shifter 80 may pass the phase-shifted optical local oscillator signal LO1 (denoted as LO1+S) to optical combiner 52. Signal beam steering is performed in the optical domain (e.g., using optical phase shifter 80) rather than in the THF domain because there are no satisfactory phase shifting circuit components that operate at frequencies as high as the frequencies of THF signals 32. Optical combiner 52 may receive optical local oscillator signal LO2 over optical path 62. Optical combiner 52 may combine optical local oscillator signals LO1 and LO2 onto optical path 40, which directs the optical local oscillator signals onto UTC PD 42 for use during signal transmission or reception.

During transmission of THF signals 32, DAC 74 may receive digital wireless data (e.g., data packets, frames, symbols, etc.) for transmission over THF signals 32. DAC 74 may convert the digital wireless data to the analog domain and may output (transmit) the data onto transmit data path 78 as data DAT (e.g., for transmission via antenna 30). Power amplifier 76 may amplify data DAT. Transmit data path 78 may pass data DAT to MZM 56 (e.g., arm 60). MZM 56 may modulate data DAT onto optical local oscillator signal LO2 to produce modulated optical local oscillator signal LO2' (e.g., an optical local oscillator signal at the frequency/wavelength of optical local oscillator signal LO2 but that is modulated to include the data identified by data DAT). Optical combiner 52 may combine optical local oscillator signal LO1 with modulated optical local oscillator signal LO2' at optical path 40.

Optical path 40 may illuminate UTC PD 42 with (using) optical local oscillator signal LO1 (e.g., with the phase shift S applied by optical phase shifter 80) and modulated optical local oscillator signal LO2'. Control circuitry may apply a control signal $V_{BIAS}$ to UTC PD 42 that configures antenna 30 for the transmission of THF signals 32. UTC PD 42 may convert optical local oscillator signal LO1 and modulated optical local oscillator signal LO2' into antenna currents on antenna resonating element 36 at the frequency of THF signals 32 (e.g., while programmed for transmission using control signal $V_{BIAS}$). The antenna currents on antenna resonating element 36 may radiate THF signals 32. The frequency of THF signals 32 is given by the difference in frequency between optical local oscillator signal LO1 and modulated optical local oscillator signal LO2'. Control signals $V_{BIAS}$ may control UTC PD 42 to preserve the modulation from modulated optical local oscillator signal LO2' in the radiated THF signals 32. External equipment that receives THF signals 32 will thereby be able to extract data DAT from the THF signals 32 transmitted by antenna 30.

During reception of THF signals 32, MZM 56 does not modulate any data onto optical local oscillator signal LO2. Optical path 40 therefore illuminates UTC PD 42 with optical local oscillator signal LO1 (e.g., with phase shift S) and optical local oscillator signal LO2. Control circuitry may apply a control signal $V_{BIAS}$ (e.g., a bias voltage) to UTC PD 42 that configures antenna 30 for the receipt of THF signals 32. UTC PD 42 may use optical local oscillator signals LO1 and LO2 to convert the received THF signals 32 into intermediate frequency signals SIGIF output onto intermediate frequency signal path 44 (e.g., while programmed for reception using bias voltage $V_{BIAS}$). Intermediate frequency signals SIGIF may include the modulated data from the received THF signals 32. Low noise amplifier 81 may amplify intermediate frequency signals SIGIF, which are then provided to MZM 56 (e.g., arm 60). MZM 56 may convert intermediate frequency signals SIGIF to the optical domain as optical signals LOrx (e.g., by modulating the data in intermediate frequency signals SIGIF onto one of the optical local oscillator signals) and may pass the optical signals to optical receiver 72 in optical components 68, as shown by arrow 63 (e.g., via optical paths 62 and 66 or other optical paths). Control circuitry may use optical receiver 72 to convert optical signals LOrx to other formats and to recover (demodulate) the data carried by THF signals 32 from the optical signals. In this way, the same antenna 30 and signal path 28 may be used for both the transmission and reception of THF signals while also performing beam steering operations.

The example of FIG. 6 in which intermediate frequency signals SIGIF are converted to the optical domain is illustrative non-limiting. If desired, transceiver circuitry 26 may receive and demodulate intermediate frequency signals SIGIF without first passing the signals to the optical domain. For example, transceiver circuitry 26 may include an analog-to-digital converter (ADC), intermediate frequency signal path 44 may be coupled to an input of the ADC rather than to MZM 56, and the ADC may convert intermediate frequency signals SIGIF to the digital domain. As another example, intermediate frequency signal path 44 may be omitted and control signals $V_{BIAS}$ may control UTC PD 42 to directly sample THF signals 32 with optical local oscillator signals LO1 and LO2 to the optical domain. As an example, UTC PD 42 may use the received THF signals 32 and control signals $V_{BIAS}$ to produce an optical signal on optical path 40. The optical signal may have an optical carrier with sidebands that are separated from the optical carrier by a fixed frequency offset (e.g., 30-100 GHz, 60 GHz, 50-70 GHz, 10-100 GHz, etc.). The sidebands may be used to carry the modulated data from the received THF signals 32. Signal path 28 may direct (propagate) the optical signal produced by UTC PD 42 to optical receiver 72 in optical components 68 (e.g., via optical paths 40, 64, 62, 66, 63, and/or other optical paths). Control circuitry may use optical receiver 72 to convert the optical signal to other formats and to recover (demodulate) the data carried by THF signals 32 from the optical signal (e.g., from the sidebands of the optical signal).

Figure 7:
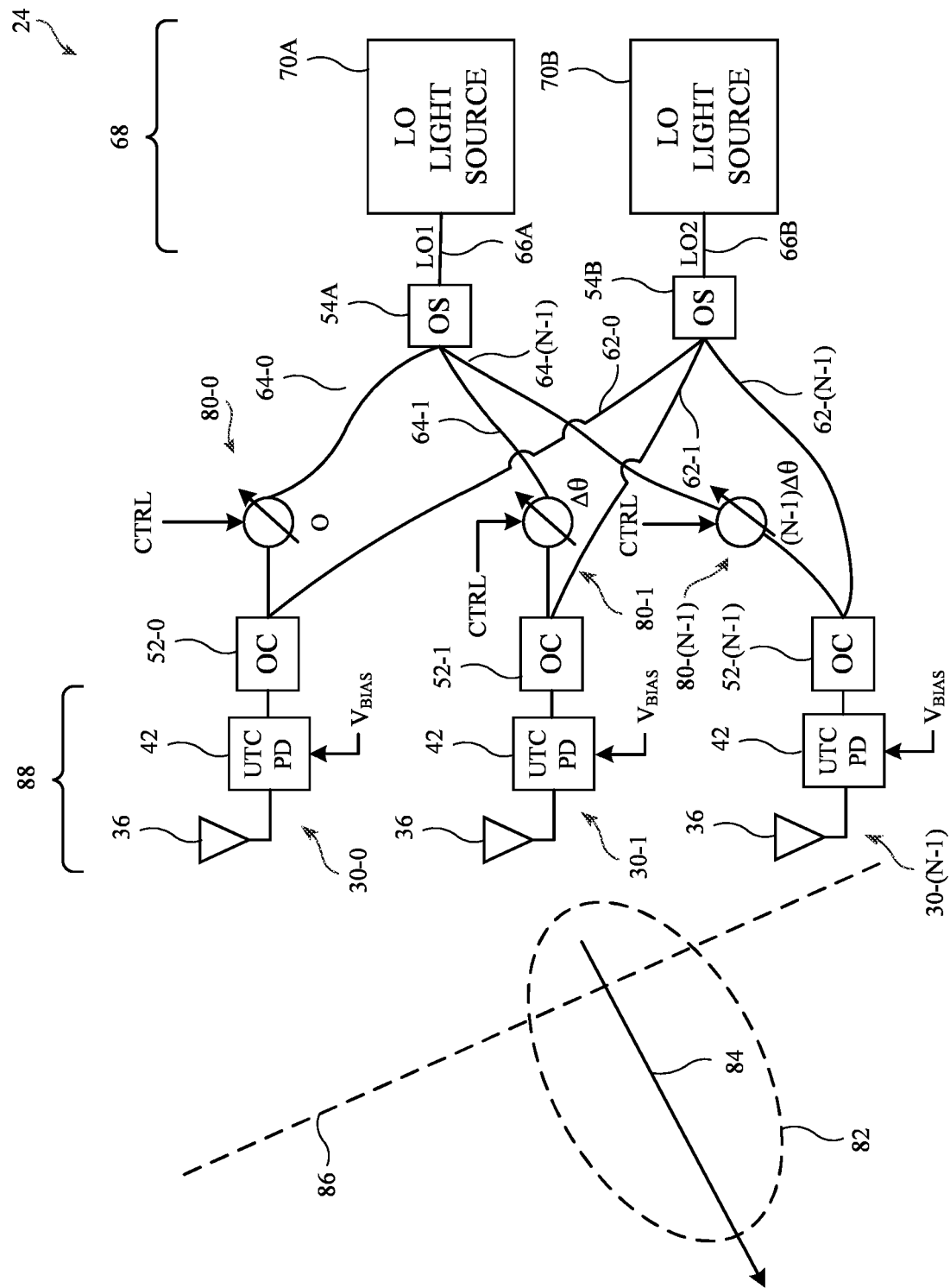
FIG. 7 is a circuit diagram of an illustrative phased antenna array that conveys wireless signals at frequencies greater than about 100 GHz within a corresponding signal beam in accordance with some embodiments.

FIG. 7 is a circuit diagram showing one example of how multiple antennas 30 may be integrated into a phased antenna array 88 that conveys THF signals over a corresponding signal beam (e.g., in examples where UE device 10 and/or AP 6 are electro-optical or photonic devices). The example of FIG. 7 is illustrative and, in general, phased antenna array 88 may be implemented using any desired array architecture (e.g., phased antenna array 88 need not use optical signals for conveying THF signals 32 and, in general, may include a set of antennas 30/30' coupled to any respective phase and/or magnitude controllers that are used for performing the beamforming operations as described herein). In the example of FIG. 7, MZMs 56, intermediate frequency signal paths 44, data paths 78, and optical receiver 72 of FIG. 6 have been omitted for the sake of clarity. Each of the antennas in phased antenna array 88 may alternatively sample received THF signals directly into the optical domain or may pass intermediate frequency signals SIGIF to ADCs in transceiver circuitry 26.

As shown in FIG. 7, phased antenna array 88 includes N antennas 30 such as a first antenna 30-0 a second antenna 30-1, an Nth antenna 30-(N-1), etc. Each of the antennas 30 in phased antenna array 88 may be coupled to optical components 68 via a respective optical signal path (e.g., optical signal path 28 of FIG. 6). Each of the N signal paths may include a respective optical combiner 52 coupled to the UTC PD 42 of the corresponding antenna 30 (e.g., the UTC PD 42 in antenna 30-0 may be coupled to optical combiner 52-0, the UTC PD 42 in antenna 30-1 may be coupled to optical combiner 52-1, the UTC PD 42 in antenna 30-(N-1) may be coupled to optical combiner 52-(N-1), etc.). Each of the N signal paths may also include a respective optical path 62 and a respective optical path 64 coupled to the corresponding optical combiner 52 (e.g., optical paths 64-0 and 62-0 may be coupled to optical combiner 52-0, optical paths 64-1 and 62-1 may be coupled to optical combiner 52-1, optical paths 64-(N-1) and 62-(N-1) may be coupled to optical combiner 52-(N-1), etc.).

Optical components 68 may include LO light sources 70 such as a first LO light source 70A and a second LO light source 70B. The optical signal paths for each of the antennas 30 in phased antenna array 88 may share one or more optical splitters 54 such as a first optical splitter 54A and a second optical splitter 54B. LO light source 70A may generate (e.g., produce, emit, transmit, etc.) first optical local oscillator signal LO1 and may provide first optical local oscillator signal LO1 to optical splitter 54A via optical path 66A. Optical splitter 54A may distribute first optical local oscillator signal LO1 to each of the UTC PDs 42 in phased antenna array 88 over optical paths 64 (e.g., optical paths 64-0, 64-1, 64-(N-1), etc.). Similarly, LO light source 70B may generate (e.g., produce, emit, transmit, etc.) second optical local oscillator signal LO2 and may provide second optical local oscillator signal LO2 to optical splitter 54B via optical path 66B. Optical splitter 54B may distribute second optical local oscillator signal LO2 to each of the UTC PDs 42 in phased antenna array 88 over optical paths 62 (e.g., optical paths 62-0, 62-1, 62-(N-1), etc.).

A respective optical phase shifter 80 may be interposed along (on) each optical path 64 (e.g., a first optical phase shifter 80-0 may be interposed along optical path 64-0, a second optical phase shifter may be interposed along optical path 64-1, an Nth optical phase shifter 80-(N-1) may be interposed along optical path 64-(N-1), etc.). Each optical phase shifter 80 may receive a control signal CTRL that controls the phase S provided to optical local oscillator signal LO1 by that optical phase shifter (e.g., first optical phase shifter 80-0 may impart an optical phase shift of zero degrees/radians to the optical local oscillator signal LO1 provided to antenna 30-0, second optical phase shifter 80-1 may impart an optical phase shift of $\Delta\phi$ to the optical local oscillator signal LO1 provided to antenna 30-1, Nth optical phase shifter 80-(N-1) may impart an optical phase shift of $(N-1)\Delta\phi$ to the optical local oscillator signal LO1 provided to antenna 30-(N-1), etc.). By adjusting the phase S imparted by each of the N optical phase shifters 80, control circuitry 14 (FIG. 1) may control each of the antennas 30 in phased antenna array 88 to transmit THF signals 32 and/or to receive THF signals 32 within a formed signal beam 82. Signal beam 82 may be oriented in a particular beam pointing direction (angle) 84 (e.g., the direction of peak gain of signal beam 82). The THF signals conveyed by phased antenna array 88 may have wavefronts 86 that are orthogonal to beam pointing direction 84. Control circuitry 14 may adjust beam pointing direction 84 over time to point towards external communications equipment or an external object or to point away from external objects, as examples. While FIG. 7 shows an illustrative phased antenna array 88 of antennas 30 from UE device 10, similar structures may additionally or alternatively be used to form a phased antenna array of antennas 30' in AP 6 (sometimes referred to herein as phased antenna array 88').

While communications at frequencies greater than about 100 GHz allow for extremely high data rates (e.g., greater than 100 Gbps), radio-frequency signals at such high frequencies are subject to significant attenuation during propagation over-the-air. Integrating antennas 30 and 30' into phased antenna arrays helps to counteract this attenuation by boosting the gain of the signals in producing signal beam 82. However, signal beam 82 is highly directive and may require a line-of-sight (LOS) between UE device 10 and AP 6. If an external object is present between AP 6 and UE device 10, the external object may block the LOS between UE device 10 and access point 6, which can disrupt wireless communications using THF signals 32. If desired, a reconfigurable intelligent surface (RIS) may be used to allow UE device 10 and AP 6 to continue to communicate using THF signals 32 even when an external object blocks the LOS between UE device 10 and AP 6.

Figure 8:
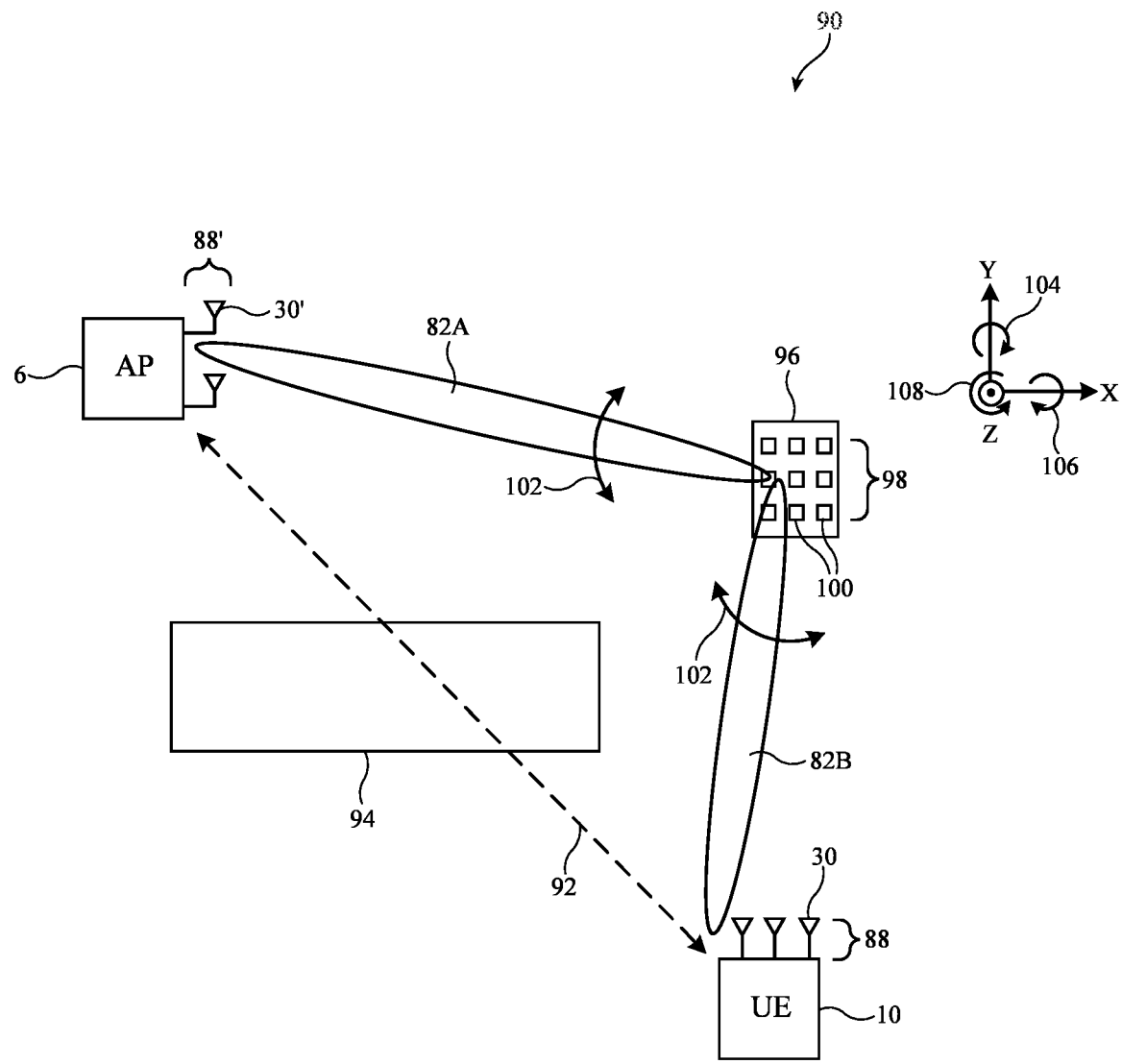
FIG. 8 is a diagram showing how an illustrative reconfigurable intelligent surface (RIS) may reflect wireless signals at frequencies greater than about 100 GHz between a wireless access point and a user equipment device in accordance with some embodiments.

FIG. 8 is a diagram of an exemplary environment 90 in which a reconfigurable intelligent surface (RIS) is used to allow UE device 10 and AP 6 to continue to communicate using THF signals 32 despite the presence of an external object in the LOS between UE device 10 and AP 6. As shown in FIG. 8, AP 6 may be at a first location in environment 90 and UE device 10 may be at a second location in environment 90. AP 6 may be separated from UE device 10 by LOS path 92. In some circumstances, an external object such as object 94 may block LOS path 92. Object 94 may be, for example, furniture, a body or body part, an animal, a wall or corner of a room, a cubicle wall, a vehicle, a landscape feature, or other obstacles or objects that may block LOS path 92.

In the absence of external object 94, AP 6 may form a corresponding signal beam (e.g., signal beam 82 of FIG. 7) oriented in the direction of UE device 10 and UE device 10 may form a corresponding signal beam (e.g., signal beam 82 of FIG. 7) oriented in the direction of AP 6. AP 6 may form a corresponding AP beam oriented towards UE device 10 (e.g., over LOS path 92) and UE device 10 may form a corresponding UE beam oriented towards UE device 10 (e.g., over LOS path 92 and overlapping the AP beam). UE device 10 and AP 6 can then convey THF signals 32 over their respective beams and LOS path 92.

However, the presence of external object 94 prevents THF signals 32 from being conveyed over LOS path 92. RIS 96 may be placed or disposed within environment 90 to allow UE device 10 and AP 6 to exchange THF signals 32 despite the presence of external object 94 within LOS path 92. RIS 96 may also be used to reflect signals between UE device 10 and AP 6 when reflection via RIS 96 offers superior radio-frequency propagation conditions to LOS path 92 (e.g., when the LOS between AP 6 and RIS 96 and the LOS between RIS 96 and UE device 10 collectively exhibit better radio-frequency channel conditions than LOS path 92).

RIS 96 (sometimes referred to as intelligent reflective/reconfigurable surface (IRS) 96, reflective surface 96, reconfigurable surface 96, or electronic device 96) is an electronic device that includes a two-dimensional surface of engineered material having reconfigurable properties for performing communications between AP 6 and UE device 10. RIS 96 may include an array 98 of antenna elements 100 on an underlying substrate. The substrate may be a rigid or flexible printed circuit board, a package, a plastic substrate, meta-material, or any other desired substrate. The substrate may be planar or may be curved in one or more dimensions. If desired, the substrate and antenna elements 100 may be enclosed within a housing. The housing may be formed from materials that are transparent to THF signals 32. If desired, RIS 96 may be disposed (e.g., layered) onto an underlying electronic device. RIS 96 may also be provided with mounting structures (e.g., adhesive, brackets, a frame, screws, pins, clips, etc.) that can be used to affix or attach RIS 96 to an underlying structure such as another electronic device, a wall, the ceiling, the floor, furniture, etc. Disposing RIS 96 on a ceiling, wall, column, pillar, or at or adjacent to the corner of a room (e.g., a corner where two walls intersect, where a wall intersects with the floor or ceiling, where two walls and the floor intersect, or where two walls and the ceiling intersect), as examples, may be particularly helpful in allowing RIS 96 to reflect THF signals between AP 6 and UE 10 around various objects 94 that may be present within the room.

RIS 96 may be a powered device that includes control circuitry (e.g., one or more processors) that help to control the operation of array 98 (e.g., control circuitry such as control circuitry 14 of FIG. 1). When electro-magnetic (EM) energy waves (e.g., waves of THF signals 32) are incident on RIS 96, the wave is effectively reflected by each antenna element 100 in array 98 (e.g., via re-radiation by each antenna element 100 with a respective phase and amplitude response). The control circuitry on RIS 96 may determine the response on a per-element or per-group-of-elements basis (e.g., where each antenna element has a respective programmed phase and amplitude response or the antenna elements in different sets/groups of antenna elements are each programmed to share the same respective phase and amplitude response across the set/group but with different phase and amplitude responses between sets/groups). The scattering, absorption, reflection, and diffraction properties of the entire RIS can therefore be changed over time and controlled (e.g., by software running on the RIS or other devices communicably coupled to the RIS such as AP 6 or UE device 10). One way of achieving the per-element phase and amplitude response of antenna elements 100 is by adjusting the impedance of antenna elements 100, thereby controlling the complex reflection coefficient that determines the change in amplitude and phase of the re-radiated signal. The control circuitry on RIS 96 may configure antenna elements 100 to exhibit impedances (or other properties) that serve to reflect THF signals 32 incident from particular incident angles onto particular output angles. The antenna elements (e.g., the antenna impedances) may be adjusted to change the angle with which incident THF signals 32 are reflected off of RIS 96.

For example, the control circuitry on RIS 96 may configure array 98 to reflect THF signals 32 transmitted by AP 6 towards UE device 10 and to reflect THF signals 32 transmitted by UE device 10 towards AP 6. This may effectively cause the signal beam 82 between AP 6 and UE device 10 to form a reflected signal beam having a first portion 82A from AP 6 to RIS 96 and a second portion 82B from RIS 96 to UE device 10. To convey THF signals 32 over the reflected signal beam, phased antenna array 88' on AP 6 may perform beamforming (e.g., by configuring its antennas 30' with respective beamforming coefficients as given by an AP codebook at AP 6) to form an AP beam (sometimes referred to herein as an AP signal beam) with a beam pointing direction oriented towards RIS 96 (e.g., as shown by portion 82A of the signal beam) and phased antenna array 88 on UE device 10 may perform beamforming (e.g., by configuring its antennas 30 with respective beamforming coefficients as given by a UE codebook at UE device 10) to form a UE beam (sometimes referred to herein as a UE signal beam) with a beam pointing direction oriented towards RIS 96 (e.g., as shown by portion 82B of the signal beam).

At the same, RIS 96 may configure its own antenna elements 100 to perform beamforming with respective beamforming coefficients (e.g., as given by a RIS codebook at RIS 96). The beamforming performed at RIS 96 may include two concurrently active RIS beams (e.g., where the RIS beams are generated using a corresponding set of beamforming coefficients). RIS 96 may form a first active RIS beam (referred to herein as a RIS-AP beam) that has a beam pointing direction oriented towards AP 6 and may concurrently form a second active RIS beam (referred to herein as a RIS-UE beam) that has a beam pointing direction oriented towards UE device 10. In this way, when THF signals 32 are incident from AP 6 (e.g., within portion 82A of the signal beam), the antenna elements on RIS 96 may receive the THF signals incident from the direction of AP 6 and may re-radiate (e.g., effectively reflect) the incident THF signals 32 towards the direction of UE device 10 (e.g., within portion 82B of the signal beam). Conversely, when THF signals 32 are incident from UE device 10 (e.g., within portion 82B of the signal beam), the antenna elements on RIS 96 may receive the THF signals incident from the direction of UE device 10 and may re-radiate (e.g., effectively reflect) the incident THF signals 32 towards the direction of AP 6 (e.g., within portion 82A of the signal beam). While referred to herein as "beams," the RIS-UE and RIS-AP beams formed by RIS 96 do not include signals/data that are actively transmitted by RIS 96 but instead correspond to the impedance, phase, and/or magnitude response settings for antenna elements 100 that shape the reflected signal beam of THF signals from a corresponding incident direction/angle onto a corresponding output direction/angle (e.g., the RIS-UE and RIS-AP beams may be effectively formed using a corresponding set of beamforming coefficients but are not associated with the active transmission of wireless signals by RIS 96).

The control circuitry on RIS 96 may set and adjust the impedances (or other characteristics) of antenna elements 100 in array 98 to reflect THF signals 32 in desired directions (e.g., using a data transfer RAT associated with communications at the frequencies of THF signals 32). The control circuitry on RIS 96 may communicate with AP 6 and/or UE device 10 using radio-frequency signals at lower frequencies using a control RAT that is different than the data transfer RAT. The control RAT may be used to help control the operation of array 98 in reflecting THF signals 32 and may be used to convey any desired control signals between AP 6, RIS 96, and UE device 10 (e.g., control signals that are separate from the wireless data conveyed between AP 6 and UE device 10 using the data transfer RAT). For example, the control RAT may allow AP 6, UE device 10, and/or RIS 96 to interact with each other before a THz link is established over the data transfer RAT, e.g., to set up, establish, and maintain the THz link with the data transfer RAT, to coordinate control procedures between AP 6 and UE device 10 such as beam sweeping or beam tracking, etc. RIS 96 may include transceiver circuitry and the control circuitry on RIS 96 may include one or more processors that handle communications using the control RAT. One or more antenna elements 100 on RIS 96 may be used to convey radio-frequency signals using the control RAT or RIS 96 may include one or more antennas that are separate from array 98 for performing communications using the control RAT.

To minimize the cost, complexity, and power consumption of RIS 96, RIS 96 may include only the components and control circuitry required to control and operate array 98 to reflect THF signals 32. Such components and control circuitry may include components for adjusting the phase and magnitude responses (e.g., impedances) of antenna elements 100 as required to change the direction with which RIS 96 reflects THF signals 32 (e.g., as required to steer the RIS-AP beam and the RIS-UE beam, as shown by arrows 102). The components may include, for example, components that adjust the impedances or other characteristics of antenna elements 100 so that each antenna element exhibits a respective complex reflection coefficient, which determines the phase and amplitude of the reflected (re-radiated) signal produced by each antenna element (e.g., such that the signals reflected across the array constructively and destructively interfere to form a reflected signal beam in a corresponding beam pointing direction). All other components that would otherwise be present in UE device 10 or AP 6 may be omitted from RIS 96 (e.g., other processing circuitry, input/output devices such as a display or user input device, transceiver circuitry for generating and transmitting, receiving, or processing wireless data conveyed using THF signals 32, etc.). In other words, the control circuitry on RIS 96 may adjust the antenna elements 100 in array 98 to shape the electromagnetic waves of THF signals 32 (e.g., reflected/re-radiated THF signals 32) for the data transfer RAT without using antenna elements 100 to perform any data transmission or reception operations and without using antenna elements 100 to perform radio-frequency sensing operations. RIS 96 may also include components for communicating using the control RAT.

As one example, array 98 may be implemented using the components of phased antenna array 88 of FIG. 7. However, since RIS 96 does not actually generate or transmit wireless data using array 98 and the data transfer RAT, antenna elements 100 may be implemented without modulators, without a receiver, without a transmitter, without converter circuitry, without mixer circuitry, and/or without other circuitry involved in the transmission or reception of wireless data. If desired, each antenna element 100 may include a respective varactor diode or other impedance-adjusting device that is coupled to a corresponding antenna resonating element. The varactor diode or other impedance-adjusting device may be adjusted using control signals to adjust the impedance of the antenna element to change the phase/amplitude of the THF signals reflected by the antenna element for performing beamforming (e.g., antenna elements 100 may reflect THF signals 32 without the use of optical local oscillator signals, thereby allowing RIS 96 to also omit the LO light sources 70 and signal path 28 (FIG. 6), which may otherwise be implemented in UE device 10 and/or AP 6, to further reduce cost, complexity, and power consumption).

Consider an example in which each antenna element 100 includes a respective antenna resonating element 36 and UTC PD 42 as in antenna 30 of FIGS. 2-7. In this example, UTC PD 42 need not be supplied with optical local oscillator signals because antenna element 100 is only used for passive signal reflection and not for active signal transmission or reception. Control signals $V_{BIAS}$ may include a bias voltage and/or other control signals that configure UTC PD 42 to exhibit a selected output impedance. UTC PD 42 may also be replaced with a varactor diode or other impedance-adjusting device configured to adjust the output impedance. The selected output impedance may be mismatched with respect to the input impedance of antenna resonating element 36 (e.g., at the frequencies of THF signals 32). This impedance mismatch may cause antenna element 100 to reflect (scatter) incident THF signals 32 as reflected (scattered) THF signals (e.g., with a corresponding complex reflection coefficient).

The selected impedance mismatch may also configure antenna element 100 to impart a selected phase shift and/or carrier frequency shift on the reflected THF signals relative to the incident THF signals 32 (e.g., where the reflected THF signals are phase-shifted with respect to THF signals 32 by the selected phase shift, are frequency-shifted with respect to THF signals 32 by the selected carrier frequency shift, etc.). Additionally or alternatively, the system may be adapted to configure antenna element 100 to impart polarization changes on the reflected THF signals relative to the incident THF signals 32. Control signals $V_{BIAS}$ may change, adjust, or alter the output impedance of UTC PD 42 (or the varactor diode or other impedance-adjusting device) over time to change the amount of mismatch between the output impedance of UTC PD 42 (or the varactor diode or other device) and the input impedance of antenna resonating element 36 to impart the reflected THF signals with different phase shifts and/or carrier frequency shifts. In other words, control circuitry on RIS 96 (e.g., control circuitry with similar components and/or functionality as control circuitry 14 of FIG. 1) may program the phase, frequency, and/or polarization characteristics of the reflected THF signals (e.g., using the control signals $V_{BIAS}$ applied to UTC PD 42, the varactor diode, or other device).

The same impedance mismatch may be applied to all the antenna elements 100 in array 98 or different impedance mismatches may be applied for different antennas elements 100 in array 98 at any given time. Applying different impedance mismatches across array 98 may, for example, allow the control circuitry in RIS 96 to form a RIS-UE beam and a RIS-AP beam that points in one or more desired (selected) beam pointing directions. This example in which control signal $V_{BIAS}$ is used to adjust antenna impedance using UTC PD 42 is illustrative and non-limiting. In general, antenna elements 100 may be implemented using any desired antenna architecture (e.g., the antennas need not include photodiodes) and may include any desired structures that are adjusted by control circuitry (e.g., using control signals $V_{BIAS}$ or other control signals) on RIS 96 to impart the THF signals 32 reflected by each antenna element 100 with a different relative phase such that the THF signals reflected by all antenna elements 100 collectively form a reflected signal beam (e.g., a RIS-UE beam or a RIS-AP beam) oriented in a desired (selected) beam pointing direction. Such structures (e.g., impedance-adjusting devices) may include adjustable impedance matching structures or circuitry, varactor diodes, adjustable phase shifters, adjustable amplifiers, optical phase shifters, antenna tuning elements, and/or any other desired structures that may be used to change the amount of impedance mismatch produced by antenna elements 100 at the frequencies of THF signals 32.

Figure 9:
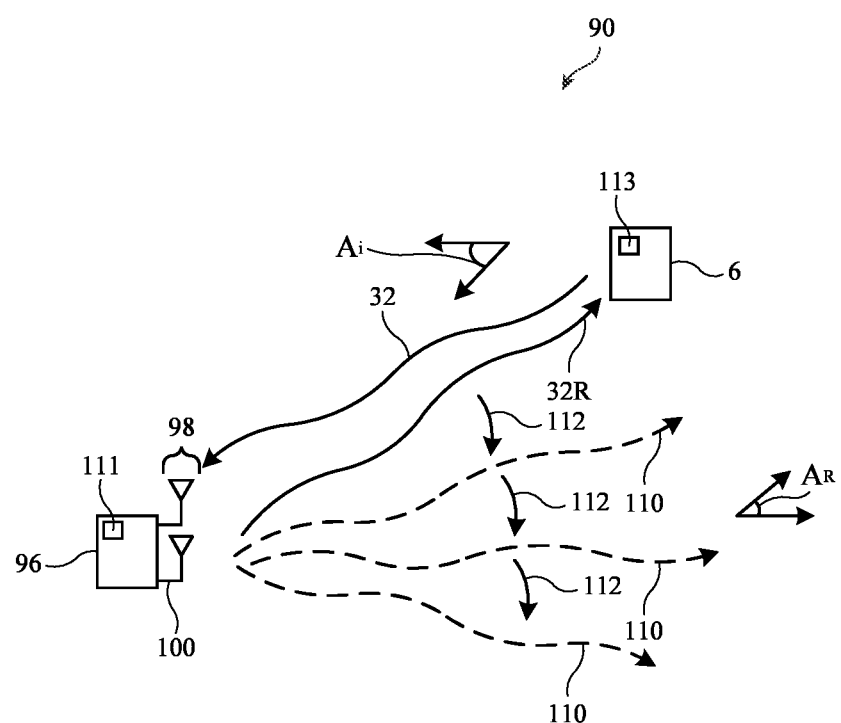
FIG. 9 is a diagram showing how an illustrative RIS may include an array of antenna elements configured to passively reflect wireless signals at frequencies greater than about 100 GHz in different directions in accordance with some embodiments.

FIG. 9 is a diagram showing how two or more antenna elements 100 on RIS 96 (e.g., array 98) may reflect incident THF signals 32 transmitted by AP 6. As shown in FIG. 9, AP 6 may transmit THF signals 32. THF signals 32 may be incident upon RIS 96 at incident angle $A_I$. Antenna elements 100 in array 98 may reflect the THF signals 32 at incident angle $A_I$ as reflected signals 32R. Control signals $V_{BIAS}$ may be varied (e.g., thereby varying imparted phase shift) across array 98 to configure array 98 to collectively reflect THF signals 32 from incident angle $A_I$ onto a corresponding output (scattered) angle $A_R$ (e.g., as a reflected signal beam with a beam pointing direction in the direction of output angle $A_R$).

Control signals $V_{BIAS}$ may configure output angle $A_R$ to be any desired angle within the field of view of RIS 96. For example, output angle $A_R$ may be oriented towards AP 6 so AP 6 receives reflected signals 32R. This may allow AP 6 to identify the position and orientation of RIS 96 (e.g., in situations where AP 6 has no a priori knowledge of the location and orientation of device RIS 96). If desired, control circuitry on RIS 96 may control output angle $A_R$ to point in other directions, as shown by arrows 110. Arrows 110 may be oriented towards UE device 10 (e.g., as a part of signal beam 82B of FIG. 8). If desired, UE device 10 may identify the location and orientation of RIS 96 based on receipt of reflected signals 32R. If desired, the control circuitry on RIS 96 may sweep reflected signals 32R over a number of different output angles $A_R$ as a function of time, as shown by arrows 112. This may, for example, help RIS 96 to establish a THF signal relay between UE device 10 and AP 6, to find other UE devices for relaying THF signals, and/or to maintain a THF signal relay between UE device 10 and AP 6 even as UE device 10 and/or object 94 (FIG. 8) move over time. The example of FIG. 9 is illustrative and non-limiting. Signals 32 may be reflected in three dimensions. RIS 96 may reflect signals transmitted by UE device 10 towards AP 6 while implementing beam steering.

In practice, AP 6 and RIS 96 are generally stationary within environment 90, whereas UE device 10 and object 94 may move over time. It can be challenging to initiate communications between AP 6 and UE device 10 via RIS 96 in this type of environment, particularly because AP 6 needs to know the relative position and orientation of RIS 96 to correctly form its AP signal beam, UE device 10 needs to know the relative position and orientation of RIS 96 to correctly form its UE signal beam, and AP 6 or UE device 10 needs to know the relative position and orientation of RIS 96 to control RIS 96 (e.g., via the control RAT) to correctly form its RIS-AP beam and RIS-UE beam. However, AP 6 and UE device 10 have no a priori knowledge of the relative position and orientation of RIS 96 prior to beginning THF communications via RIS 96.

The relative position and orientation of RIS 96 may, for example, be defined by six degrees of freedom: three translational positions along the X, Y, and Z axes of FIG. 8 and three rotational positions such as tilt (pitch), rotation (roll), and yaw, as shown by arrows 104, 106, and 108 of FIG. 8). In some scenarios, RIS 96 may include sensors (e.g., accelerometers, gyroscopes, compasses, image sensors, light sensors, radar sensors, acoustic sensors, etc.) that identify the relative position and orientation of RIS 96. In these scenarios, RIS 96 may use the control RAT to inform AP 6 and/or UE device 10 of the relative position and orientation. However, including such sensors on RIS 96 would undesirably increase the cost, complexity, and power consumption of RIS 96. It would therefore be desirable to be able to establish and maintain THF communications between UE device 10 and AP 6 via RIS 96 without the use of such sensors on RIS 96.

Figure 10:
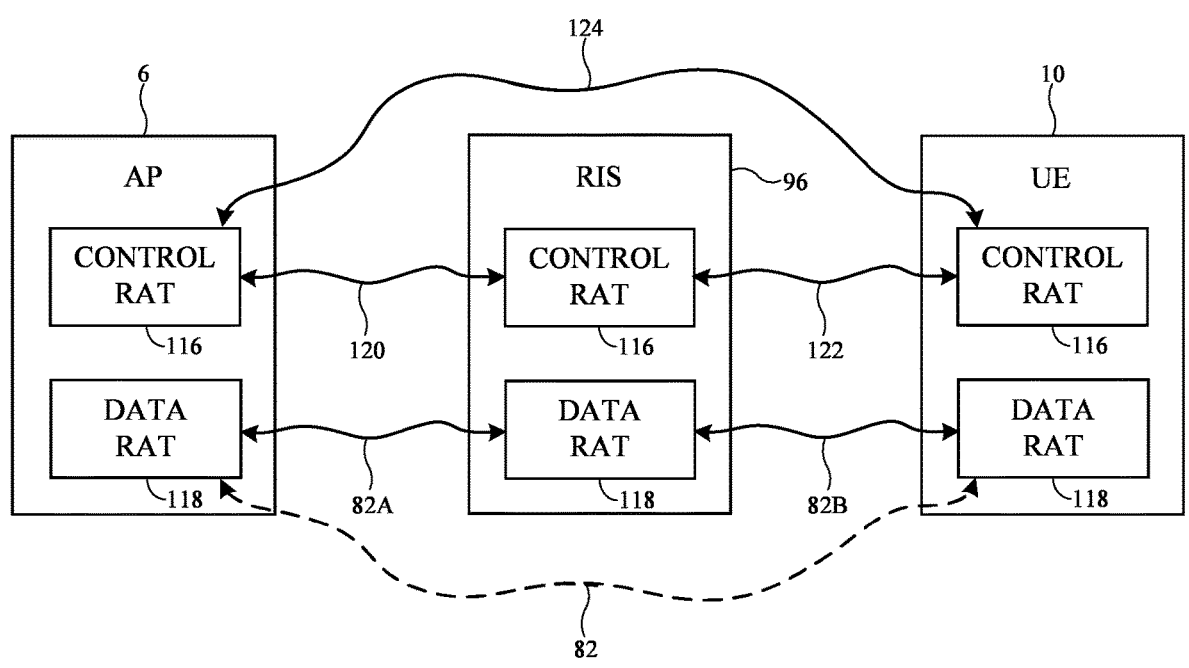
FIG. 10 is a diagram showing how an illustrative wireless access point, RIS, and user equipment device may communicate using both a data transfer radio access technology (RAT) and a control RAT in accordance with some embodiments.

FIG. 10 is a diagram showing how AP 6, RIS 96, and UE device 10 may communicate using both a control RAT and a data transfer RAT for establishing and maintaining communications between AP 6 and UE device 10 via RIS 96. As shown in FIG. 10, AP 6, RIS 96, and UE device 10 may each include wireless circuitry that operates according to a data transfer RAT 118 (sometimes referred to herein as data RAT 118) and a control RAT 116. Data RAT 118 may be a sub-THz communications RAT such as a 6G RAT that performs wireless communications at the frequencies of THF signals 32. Control RAT 116 may be associated with wireless communications that consume much fewer resources and are less expensive to implement than the communications of data RAT 118. For example, control RAT 116 may be Wi-Fi, Bluetooth, a cellular telephone RAT such as a 3G, 4G, or 5G NR FR1 RAT, etc. As another example control RAT 116 may be an infrared communications RAT (e.g., where an infrared remote control or infrared emitters and sensors use infrared light to convey signals for the control RAT between UE device 10, AP 6, and/or RIS 96).

AP 6 and RIS 96 may use control RAT 116 to convey radio-frequency signals 120 (e.g., control signals) between AP 6 and RIS 96. UE device 10 and RIS 96 may use control RAT 116 to convey radio-frequency signals 122 (e.g., control signals) between UE device 10 and RIS 96. UE device 10, AP 6, and RIS 96 may use data RAT 118 to convey THF signals 32 within the reflected signal beam (e.g., within portion 82A between AP 6 and RIS 96 and portion 82B between RIS 96 and UE device 10). The RIS-UE beam and the RIS-AP beam formed by RIS 96 may operate on THF signals transmitted using data RAT 118 to reflect the THF signals between AP 6 and UE device 10. AP 6 may use radio-frequency signals 120 and control RAT 116 and/or UE device 10 may use radio-frequency signals 122 and control RAT 116 to discover RIS 96 and to configure antenna elements 100 to establish and maintain the relay of THF signals 32 performed by antenna elements 100 using data RAT 118.

If desired, AP 6 and UE device 10 may also use control RAT 116 to convey radio-frequency signals 124 directly with each other (e.g., since the control RAT operates at lower frequencies that do not require line-of-sight). UE device 10 and AP 6 may use radio-frequency signals 124 to help establish and maintain THF communications (communications using data RAT 118) between UE device 10 and AP 6 via RIS 96. AP 6 and UE device 10 may also use data RAT 118 to convey THF signals 32 within an uninterrupted signal beam 82 (e.g., a signal beam that does not reflect off RIS 96) when LOS path 92 (FIG. 8) is available. If desired, the same control RAT 116 may be used to convey radio-frequency signals 120 between AP 6 and RIS 96 and to convey radio-frequency signals 122 between RIS 96 and UE device 10. If desired, AP 6, RIS 96, and/or UE device 10 may support multiple control RATs 116. In these scenarios, a first control RAT 116 (e.g., Bluetooth) may be used to convey radio-frequency signals 120 between AP 6 and RIS 96, a second control RAT 116 (e.g., Wi-Fi) may be used to convey radio-frequency signals 122 between RIS 96 and UE device 10, and/or a third control RAT 116 may be used to convey radio-frequency signals 124 between AP 6 and UE device 10.

Figure 11:
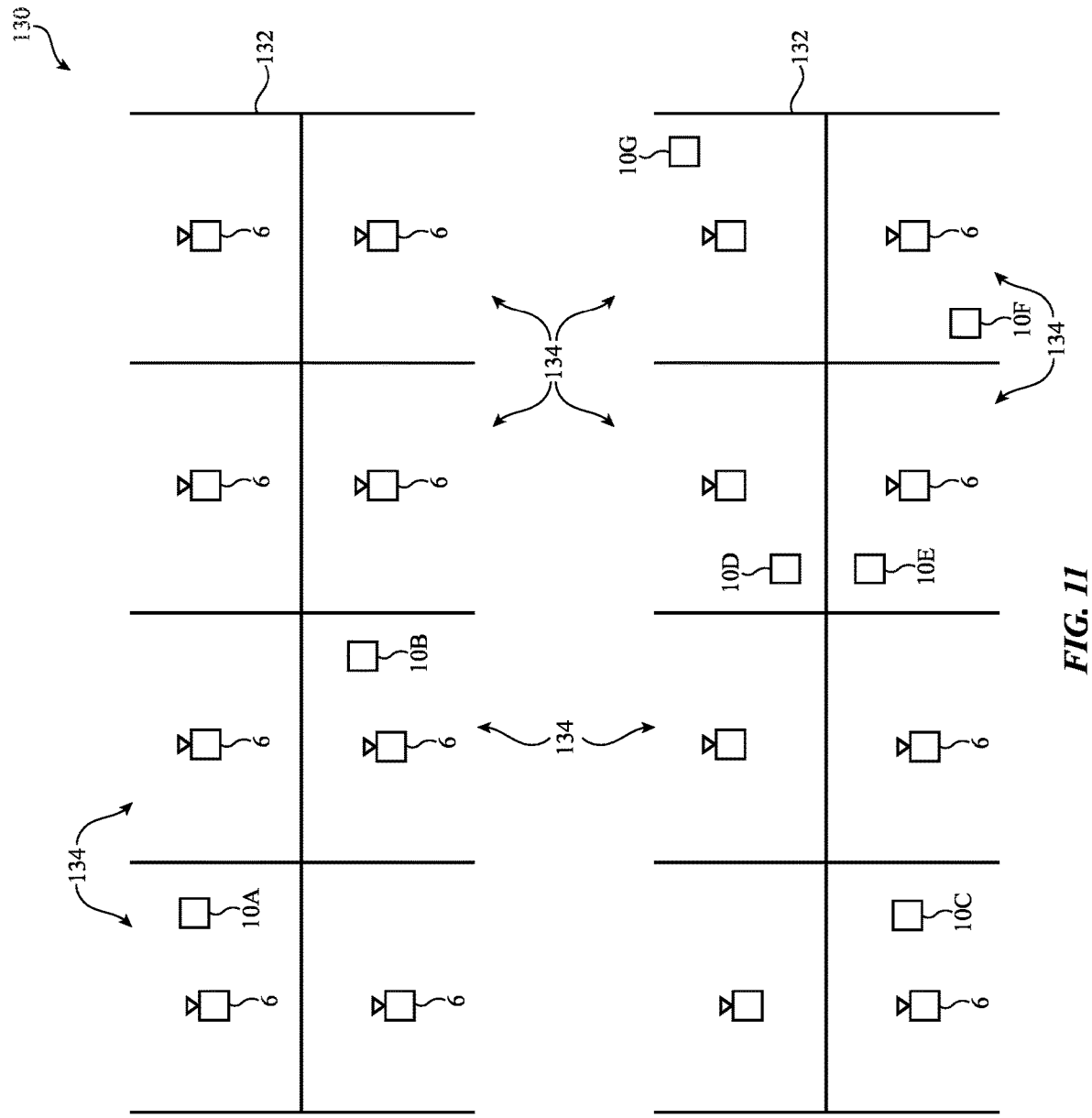
FIG. 11 is a top view of an environment having obstacles and many user equipment devices that communicate via wireless access points in accordance with some embodiments.

In many environments, multiple AP's 6 are required to provide THF coverage across a relatively large area (e.g., within an entire room). The AP's 6 may provide THF coverage to multiple UE devices 10 at different locations in the environment. FIG. 11 is a top view of an illustrative environment 130 that may include multiple AP's 6 for providing THF coverage to multiple UE devices 10. As shown in FIG. 11, obstacles 132 may be present in environment 130. Obstacles 132 (e.g., external objects such as external object 94 of FIG. 8) may include walls, furniture, cubicle walls, people, or any other objects that can block THF signals. Obstacles 132 may divide environment 130 into regions, zones, or areas 134 (e.g., cubicles in an office).

In deployments without reflective intelligent surfaces, each area 134 needs to be provided with its own AP 6 to provide coverage to UE devices 10 that may happen to be present within that area 134 (e.g., because obstacles 132 may block the LOS with other areas 134). Covering all of environment 130 with AP's 6 in this way may be excessively costly. AP's 6 themselves can be very expensive, with active transceiver chains for transmitting and receiving THF signals and with advanced signal processing capabilities. There is also excessive backhaul, installation, and maintenance costs for these deployments, as each AP 6 needs to be connected to the rest of the network (e.g., via an Ethernet backhaul) and maintained and powered over time.

In practice, there is a low likelihood that all areas 134 in environment 130 will need THF coverage at the same time (e.g., because there is a low likelihood that there will be active UE devices 10 that require THF signals to meet its wireless data transfer needs in every area 134 at any given time). In the example of FIG. 11, UE devices 10A-10F may be present in some of the areas 134 of environment 130. The AP's 6 in areas 134 without UE devices 10 thus represent wasted cost and network capacity. It would therefore be desirable to be able to dynamically provide satisfactory THF coverage to the UE devices 10 that may happen to be in different areas 134 of environment 130 at any given time while minimizing the number of AP's 6 deployed in environment 130.

One or more RIS 96 may be deployed in environment 130 to dynamically provide satisfactory THF coverage to the UE devices 10 that happen to be in different areas 134 of environment 130 at any given time while minimizing the number of AP's 6 deployed in environment 130. The RIS(s) 96 in environment 130 may be disposed at locations in environment 130 having a field of view across multiple areas 134. The RIS(s) 96 may therefore be used to relay THF signals between one or more AP 6 and one or more UE devices 10 located in multiple areas 134. This allows each area 134 to receive THF coverage from one or more AP 6 without requiring an AP 6 within each area 134, thereby minimizing deployment cost. The RIS beams of the RIS(s) 96 may be dynamically updated over time to serve different UE devices 10 in different areas 134 as needed over time.

Each UE device 10 conveys a respective stream of wireless data with one or more AP 6 via one or more RIS 96 (or directly with an AP 6 if a LOS to the AP is available). In performing THF communications with multiple UE devices 10, care should be taken to minimize or prevent interference between the streams of wireless data for each UE device. AP(s) 6 and RIS(s) 96 may minimize or prevent interference between streams of wireless data for different UE devices 10 using a space-division multiple access (SDMA) scheme (sometimes referred to herein as space-division multiplexing or spatial multiplexing), a time-division multiple access (TDMA) scheme (sometimes referred to herein as time division multiplexing or time division duplexing), and/or a frequency-division multiple access (FDMA) scheme (sometimes referred to herein as frequency division multiplexing or frequency division duplexing).

Figure 12:
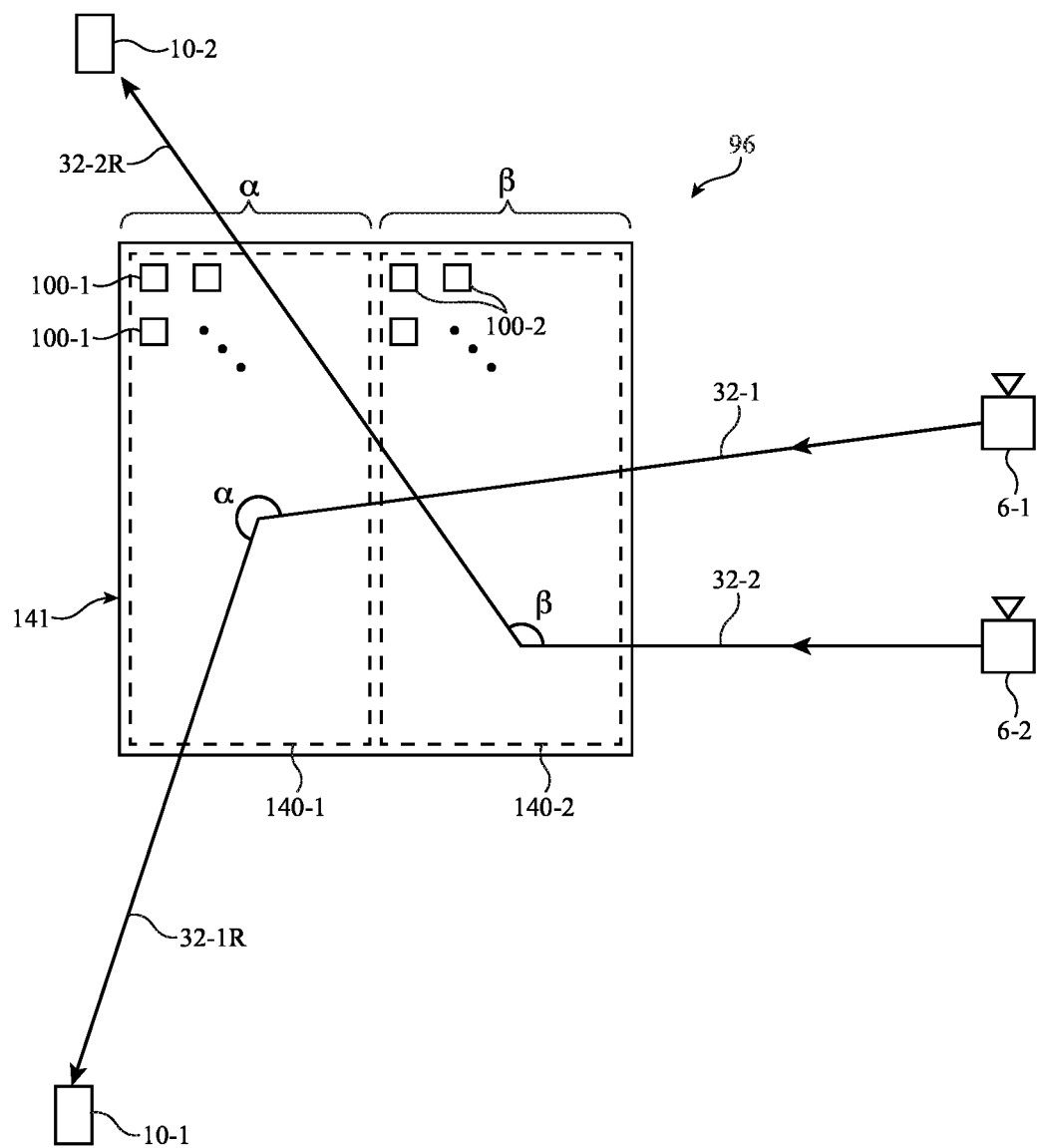
FIG. 12 is a top view of an illustrative RIS that performs spatial multiplexing using first and second sets of antenna elements configured to reflect signals from different user equipment devices in different respective directions in accordance with some embodiments.

FIG. 12 is a top view showing one example of how a RIS 96 deployed in environment 130 (FIG. 11) may perform SDMA between multiple AP's 6 and multiple UE devices 10. SDMA involves the division of the spatial resources of RIS 96 to accommodate the conveyance of independent streams of wireless data with multiple UE devices 10 without interference. As shown in FIG. 12, RIS 96 may perform SDMA for a first AP 6-1, a second AP 6-2, a first UE device 10-1, and a second UE device 10-2 at different locations in the environment. RIS 96 may include an array of antenna elements 100 on an underlying substrate 141. RIS 96 may be configured to perform SDMA by partitioning antenna elements 100 to allow multiple input-output angle correspondences for THF signals 32.

For example, antenna elements 100 may include a first set of antenna elements 100-1 and a second set of antenna elements 100-2. Antenna elements 100-1 may be configured to exhibit a first set of complex reflection coefficients (e.g., to form a first RIS-UE beam oriented in a first direction and a first RIS-AP beam oriented in a second direction) whereas antenna elements 100-2 are concurrently configured to exhibit a second set of complex reflection coefficients (e.g., to form a second RIS-UE beam oriented in a second third and a second RIS-AP beam oriented in a fourth direction). The first set of antenna elements 100-1 may be configured such that the first RIS-UE beam points towards UE device 10-1 and the first RIS-AP beam points towards AP 6-1. The second set of antenna elements 100-2 may be concurrently configured such that the second RIS-UE beam points towards UE device 10-2 and the second RIS-AP beam points towards AP 6-2.

In the example of FIG. 12, the first set of antenna elements 100-1 are disposed in a first rectangular region 140-1 of substrate 141 whereas the second set of antenna elements 100-2 are disposed in a second rectangular region 140-2 of substrate 141 that is different from the first rectangular region. This is illustrative and, in general, the first set of antenna elements 100-1 and the second set of antenna elements 100-2 may be disposed in any desired regions on substrate 141 and may be arranged in any desired patterns. One or more of the antenna elements in the first set of antenna elements 100-1 may be interleaved with one or more of the antenna elements in the second set of antenna elements 100-1 if desired (e.g., the first and second regions may be at least partially overlapping).

When configured in this way, AP 6-1 may transmit THF signals 32-1 towards the first set of antenna elements 100-1 (e.g., within a signal beam overlapping the region of substrate 141 that includes the first set of antenna elements 100-1). AP 6-2 may concurrently transmit THF signals 32-2 towards the second set of antenna elements 100-2 (within a signal beam overlapping the region of substrate 141 that includes the first set of antenna elements 100-1). The first RIS-AP beam and the first RIS-UE beam formed by the first set of antenna elements 100-1 may reflect THF signals incident from the direction of AP 6-1 onto the direction of UE device 10-1. The first set of antenna elements 100-1 may therefore reflect THF signals 32-1 at a corresponding angle a towards UE device 10-1, as shown by reflected signals 32-1R (e.g., the reflection coefficients of the first set of antenna elements 100-1 may produce reflection of incident THF signals onto an output angle that is oriented at angle a with respect to the angle of incidence). Similarly, the second RIS-AP beam and the second RIS-UE beam formed by the second set of antenna elements 100-2 may reflect THF signals incident from the direction of AP 6-2 onto an output angle in the direction of UE device 10-2. The second set of antenna elements 100-2 may therefore reflect THF signals 32-2 at a corresponding angle β towards UE device 10-2, as shown by reflected signals 32-2R (e.g., the reflection coefficients of the second set of antenna elements 100-2 may produce reflection of incident THF signals onto an output angle that is oriented at angle β with respect to the angle of incidence).

In this way, the same RIS 96 may be used to concurrently direct THF signals 32 from two different AP's 6 onto two different UE devices 10 at different locations in environment 130 (e.g., using the SDMA scheme). While multiple incoming signal beams from spatially separate AP's (e.g., signal beams of THF signals 32-1 and THF signals 32-2 from AP 6-1 and 6-2) can "interfere" with each other at RIS 96, the outgoing signal beams remain separate and distinct with a low likelihood of cross-beam interference at the location of the UE devices (e.g., at the location of UE devices 10-1 and 10-2). In the implementation of FIG. 12, AP 6-1 can utilize all of its resources (e.g., all of the frequency and time resources of its corresponding transmit chain) to provide a stream of wireless data to UE device 10-1 via RIS 96 and AP 6-2 can concurrently utilize all of its resources (e.g., all of the frequency and time resources of its corresponding transmit chain) to provide a stream of wireless data to UE device 10-2. This may serve to maximize the data rate and wireless performance of UE devices 10-1 and 10-2 via RIS 96 despite the lack of a LOS between the UE devices and the AP's.

While the example of FIG. 12 illustrates downlink transmission of THF signals 32 from AP's 6 to UE devices 10 via RIS 96 for the sake of simplicity, RIS 96 may conversely reflect THF signals 32 during uplink transmission of THF signals 32 from UE devices 10 to AP's 6 (e.g., the RIS beams formed by the first set of antenna elements 100-1 may configure RIS 96 to reflect THF signals conveyed between UE device 10-1 and AP 6-1 with angle a while the second set of antenna elements 100-2 configures RIS 96 to concurrently reflect THF signals conveyed between UE device 10-1 and AP 6-1 with angle β). If RIS 96 is relatively large (e.g., as allowed by deployments on the ceiling of an office), the beamforming gain of the first set of antenna elements 100-1 and the beamforming gain of the second set of antenna elements 100-2 can still be quite large. Alternatively, RIS 96 of FIG. 12 may be replaced with a first, smaller, RIS 96 having the first set of antenna elements 100-1 deployed adjacent to a second, smaller, RIS 96 having the second set of antenna elements 100-2.

In the example of FIG. 12, each AP 6 illuminates a respective region of RIS 96 with THF signals. In some implementations, AP's 6 may not be capable of illuminating only a subset of RIS 96 with a beam of THF signals and may instead illuminate all of RIS 96 using its beam of THF signals. In these implementations, RIS 96 may still perform satisfactory SDMA THF signal reflection between the AP's and multiple UE devices, as shown in FIG. 13.

Figure 13:
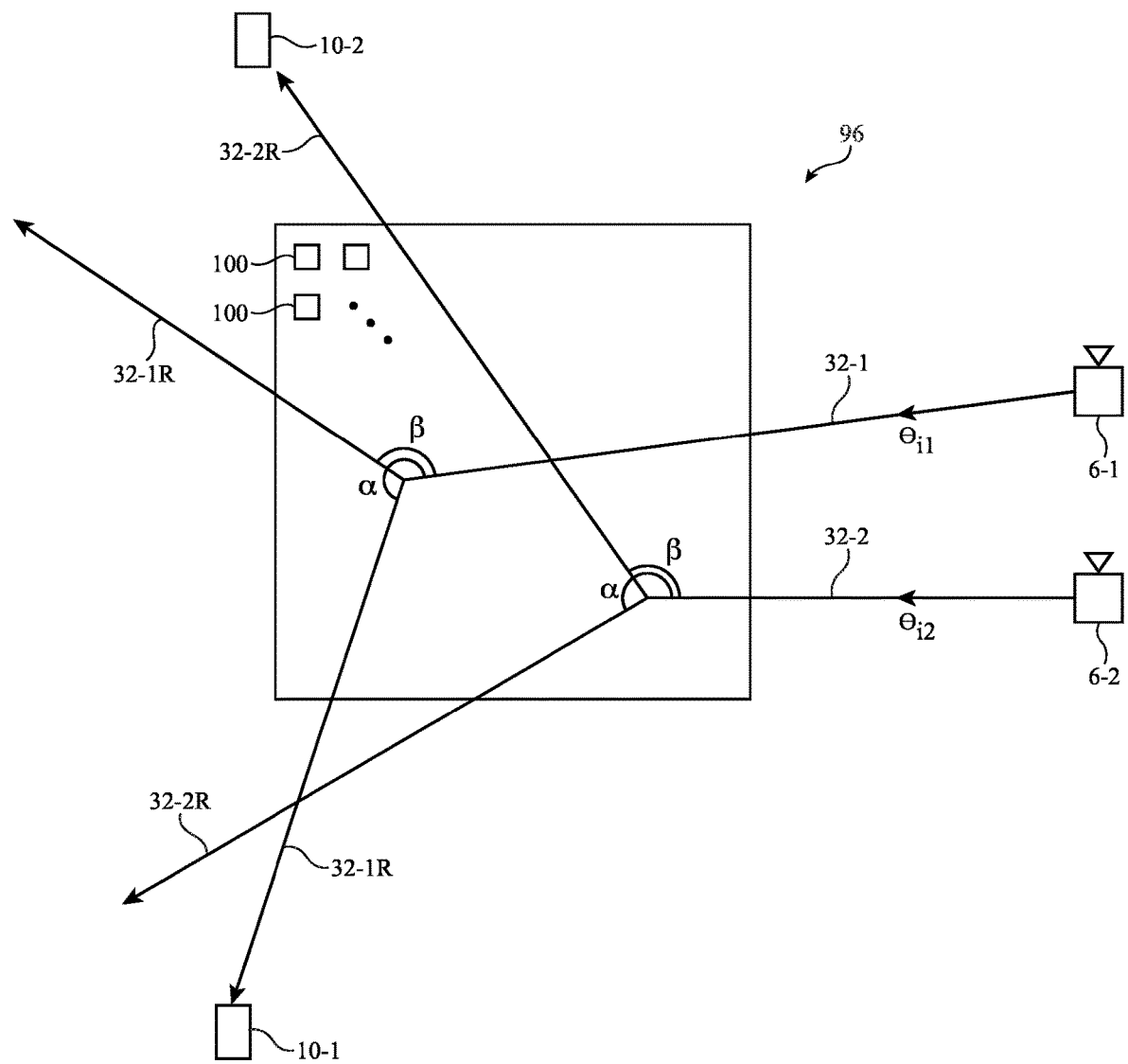
FIG. 13 is a top view of an illustrative RIS that performs spatial multiplexing using a single set of antenna elements configured to reflect signals from different user equipment devices in different directions in accordance with some embodiments.

In the example of FIG. 13, AP 6-1 and AP 6-2 each illuminate an entirety of RIS 96 with a respective THF signal beam. AP 6-1 may illuminate an entirety of RIS 96 using THF signals 32-1 within a signal beam oriented at an incident angle $\theta_{i1}$ with respect to RIS 96. AP 6-2 may concurrently illuminate an entirety of RIS 96 using THF signals 32-2 within a signal beam oriented at an incident angle $\theta_{i2}$ with respect to RIS 96. The antenna elements 100 on RIS 96 may be provided with complex reflection coefficients that configure the antenna elements 100 to reflect (scatter) incident THF signals at angles α and β with respect to the corresponding incident angle. The complex reflection coefficients (e.g., the settings for antenna elements 100) may be configured such that reflection by angle α will direct THF signals incident at incident $\theta_{i1}$ (e.g., THF signals 32-1 transmitted by AP 6-1) towards UE device (e.g., as reflected signals 32-1R) and such that reflection by angle β will direct THF signals incident at incident $\theta_{i2}$ (e.g., THF signals 32-2 transmitted by AP 6-2) towards UE device 10-2 (e.g., as reflected signals 32-2R). Assuming UE device 10-1 is not located immediately adjacent to UE device 10-2 and AP 6-1 is not co-located with AP 6-2, the concurrent reflection of THF signals 32-1 by angle β' will produce reflected signals 32-1R that are directed away from the location of UE device 10-2. Similarly, the concurrent reflection of THF signals 32-2 by angle α' will produce reflected signals 32-2R that are directed away from the location of UE device 10-1. This may effectively prevent interference between the streams of wireless data for UE devices 10-1 and 10-2.

While the example of FIG. 13 illustrates downlink transmission of THF signals 32 from AP's 6 to UE devices 10 via RIS 96 for the sake of simplicity, RIS 96 may conversely reflect THF signals 32 during uplink transmission of THF signals 32 from UE devices 10 to AP's 6. The examples of FIGS. 12 and 13 in which SDMA is used to prevent interference between the streams of wireless data for UE devices 10-1 and 10-2 is illustrative and non-limiting. Additionally or alternatively, TDMA, FDMA, and/or code-division multiple access (CDMA) schemes may be used to prevent interference between the streams of wireless data for multiple UE devices that communicate with AP(s) 6 via reflection off a RIS 96.

Figure 14:
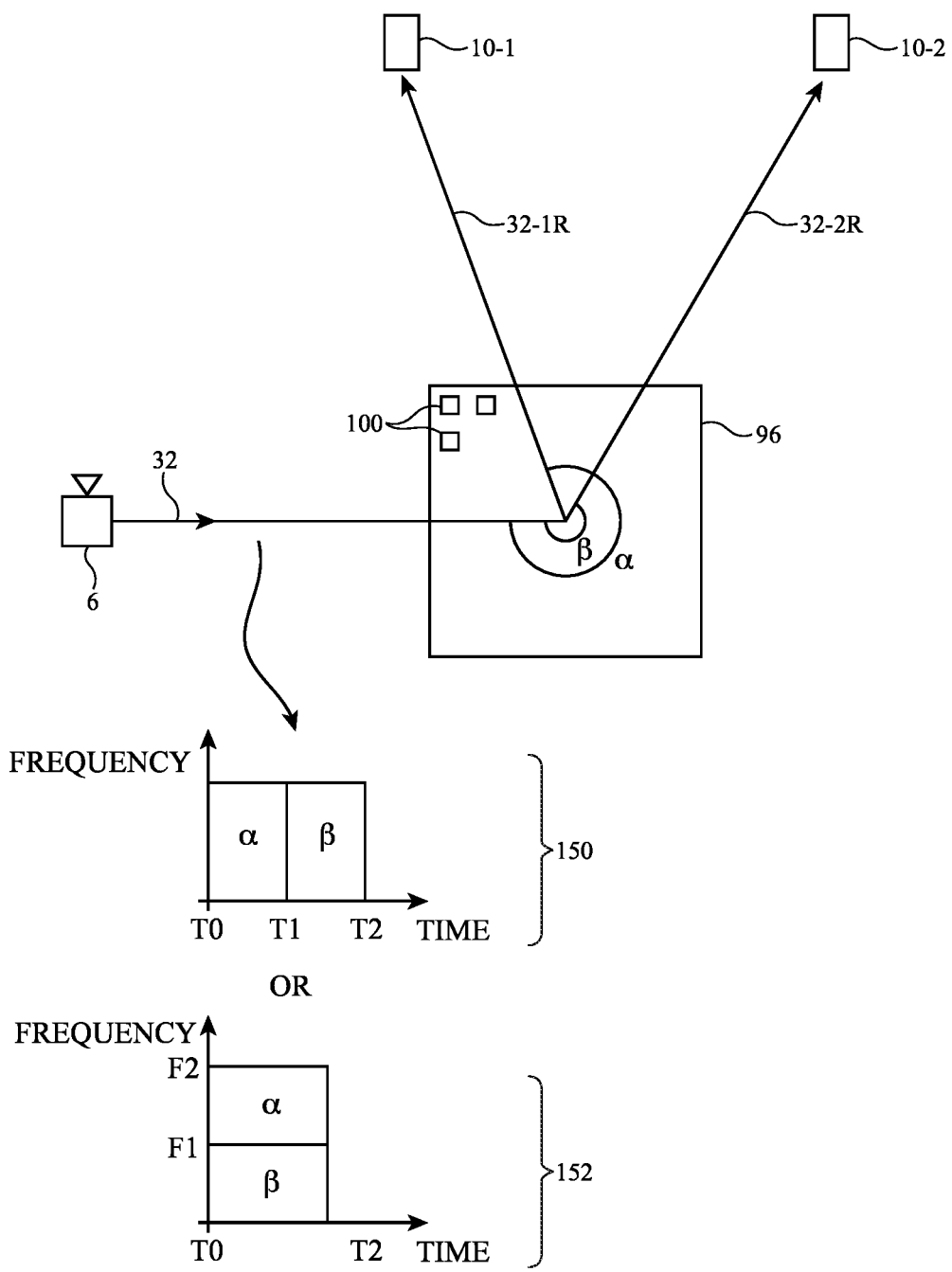
FIG. 14 is a top view of an illustrative RIS that performs time division multiplexing or frequency division multiplexing to reflect signals from a single wireless access point to different user equipment devices in accordance with some embodiments.

FIG. 14 is a top view showing one example of how a RIS 96 deployed in environment 130 (FIG. 11) may perform TDMA, FDMA, and/or CDMA between a given AP 6 and at least first UE device and second UE device 10-2. TDMA involves the division of the temporal resources of RIS 96, AP 6, and UE device 10 to accommodate the conveyance of independent streams of wireless data with multiple UE devices 10 without interference. Reflections by RIS 96 are ideally irrespective of frequencies (e.g., sub-bands within the larger bandwidth may all be reflected in the same manner). In practice, beam squint effects or other effects may prevent reflections being irrespective of frequencies because fixed antenna element spacings will result in different phase deltas at different frequencies. However, an FDMA scheme, which involves the division of the frequency resources of RIS 96, AP 6, and UE device 10 to accommodate the conveyance of independent streams of wireless data with multiple UE devices 10 without interference, may be performed in implementations where RIS 96 is able to perform frequency-selective reflection using antenna elements 100. In general, if two UE devices or AP's are co-located so they are not distinguishable in angle space, FDMA and/or TDMA schemes may be used to separate the UE devices and/or AP's. In addition, if one AP serves two UE devices 10 but only has a single transmit/receive chain, the AP needs to divide its physical resources in time (e.g., using the TDMA scheme) and/or frequency (e.g., using the FDMA scheme). The AP may then either use one AP beam for one RIS having two reflection sets or may form two AP beams transmitting the same FDMA signal to two RIS's and ultimately to two UE devices who then select their respective sub-bands. Additionally or alternatively, a CDMA scheme may allow different spreading codes to be used to convey different streams with different UE devices.

As shown in FIG. 14, AP 6 may transmit THF signals 32 towards RIS 96. AP 6 may include a single transmit chain that transmits THF signals 32. The transmit chain may allocate temporal and frequency resources to THF signals 32. If desired, the transmit chain may transmit THF signals 32 using a TDMA scheme as shown by plot 150, which plots frequency resources on the vertical axis and temporal resources on the horizontal axis. Under the TDMA scheme, AP 6 may transmit a first stream of wireless data for UE device 10-1 in THF signals 32 between times T0 and T1. AP 6 may then transmit a second stream of wireless data for UE device 10-2 in THF signals 32 between times T1 and T2.

Between times T0 and T1, the antenna elements 100 on RIS 96 may be programmed to reflect the incident THF signals 32 at angle α towards UE device 10-1 (as reflected signals 32-1R). At time T1, the antenna elements 100 may be re-programmed to form RIS beams that exhibits a different reflection angle. Between times T1 and T2, the antenna elements 100 on RIS 96 may reflect the incident THF signals 32 at angle β towards UE device 10-2 (as reflected signals 32-2R). Since each stream of wireless data is transmitted at different times, AP 6 may communicate with UE device 10-1 and UE device 10-2 via RIS 96 under the TDMA scheme without interference between the data streams.

Additionally or alternatively, the transmit chain on AP 6 may transmit THF signals 32 using an FDMA scheme as shown by plot 152, which plots frequency resources on the vertical axis and temporal resources on the horizontal axis. Under the FDMA scheme, AP 6 may transmit the first stream of wireless data for UE device 10-1 at frequencies between frequency F1 and frequency F2 in THF signals 32 (e.g., between times T0 and T2). The transmit chain may concurrently transmit the second stream of wireless data for UE device 10-2 at frequencies between frequency F0 and frequency F1 in THF signals 32 (e.g., between times T0 and T2).

The antenna elements 100 on RIS 96 may be programmed to reflect incident THF signals 32 at angle α towards UE device 10-1 (as reflected signals 32-1R). The antenna elements 100 on RIS 96 may be programmed to concurrently reflect incident THF signals 32 between at angle β towards UE device 10-2 (as reflected signals 32-1R within an additional concurrent signal beam). UE device 10-1 may tune to frequencies between F1 and F2 whereas UE device 10-2 may tune to frequencies between F0 and F1 to recover their respective streams of wireless data. In situations where SDMA is not perfectly orthogonal, the TDMA scheme, the FDMA, and/or a CDMA scheme may be combined with the SDMA scheme if desired.

While the example of FIG. 14 illustrates downlink transmission of THF signals 32 from AP 6 to UE devices 10 via RIS 96 for the sake of simplicity, RIS 96 may conversely reflect THF signals 32 during uplink transmission of THF signals 32 from UE devices 10 to AP 6. Additionally or alternatively, a single AP 6 may transmit THF signals 32 using TDMA and/or FDMA with two different RIS's 96, as shown in the example of FIG. 15.

Figure 15:
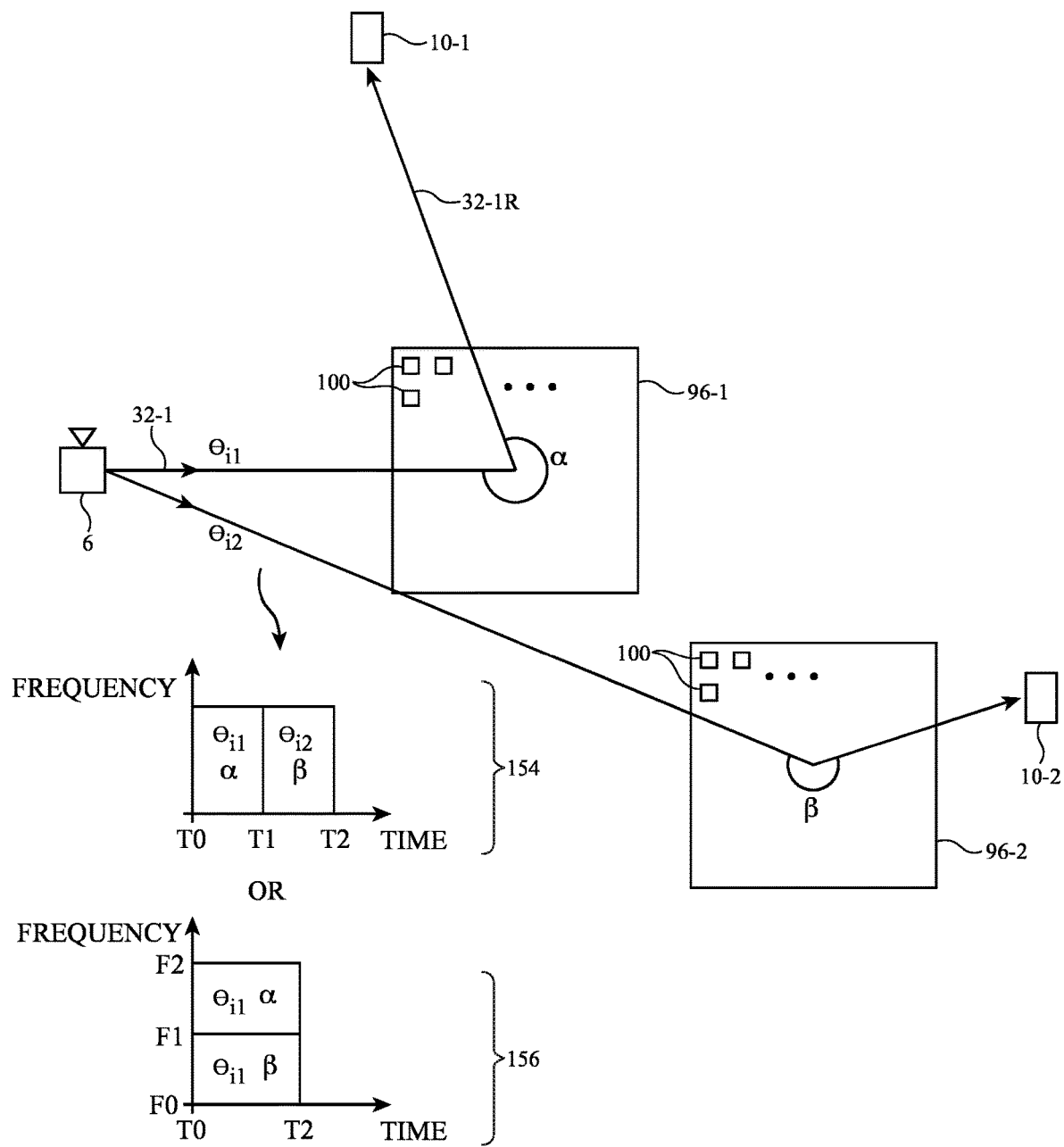
FIG. 15 is a top view showing how an illustrative wireless access point may perform time division multiplexing or frequency division multiplexing to direct signals to a first user equipment device via a first RIS or to a second user equipment device via a second RIS in accordance with some embodiments.

As shown in FIG. 15, AP 6 may transmit THF signals to a first RIS 96-1 and to a second RIS 96-2. The transmit chain on AP 6 may transmit THF signals to RIS 96-1 and RIS 96-2 using a TDMA scheme as shown by plot 154. Under the TDMA scheme, between times T0 and T1, AP 6 may transmit a first stream of wireless data for UE device 10-1 in a first beam of THF signals 32-1 that points towards RIS 96-1 (e.g., that is oriented at a first angle $\theta_{i1}$). The antenna elements 100 on RIS 96-1 may be programmed to reflect THF signals 32-1 incident at first angle $\theta_{i1}$ by an angle α such that the corresponding reflected signals 32-1R are directed towards UE device 10-1. Between times T1 and T2, AP 6 may transmit a second stream of wireless data for UE device 10-2 in a second beam of THF signals 32-2 that points towards RIS 96-2 (e.g., that is oriented at a second angle $\theta_{i2}$). The phased antenna array on AP 6 may perform beam steering to orient the beam of THF signals in the desired directions. The antenna elements 100 on RIS 96-2 may be programmed to reflect THF signals 32-2 incident at second angle $\theta_{i2}$ by an angle β such that the corresponding reflected signals 32-2R are directed towards UE device 10-2.

Additionally or alternatively, AP 6 may transmit THF signals to first RIS 96-1 and second RIS 96-2 at different frequencies which are then picked up by different respective UE devices. While the example of FIG. 15 illustrates downlink transmission of THF signals from AP 6 to UE devices 10 via RIS 96-1 and RIS 96-2 for the sake of simplicity, RIS 96-1 and RIS 96-2 may conversely reflect THF signals during uplink transmission of the THF signals from UE devices 10-1 and 10-2 to AP 6.

Figure 16:
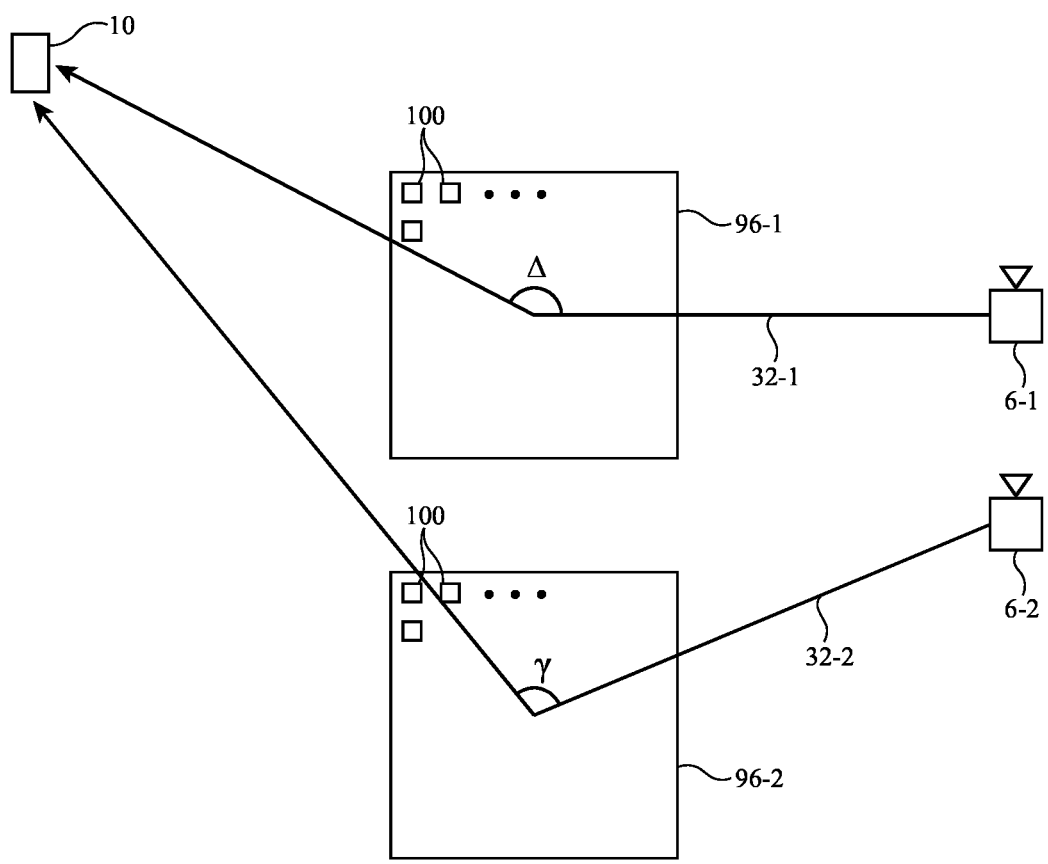
FIG. 16 is a top view showing how illustrative first and second wireless access points may direct signals to the same user equipment device via a first RIS and a second RIS, respectively, in accordance with some embodiments.

Additionally or alternatively, two AP's 6 may use RIS 96-1 and RIS 96-2 to transmit THF signals to the same UE device 10 (e.g., using a distributed multiple-input and multiple output (MIMO) scheme). FIG. 16 is a diagram showing how two AP's, RIS 96-1, and RIS 96-2 may convey THF signals to a UE device 10 using a distributed MIMO scheme. As shown in FIG. 16, a first AP 6-1 may transmit a first stream of wireless data in THF signals 32-1 to first RIS 96-1. A second AP 6-2 may concurrently transmit a second stream of wireless data in THF signals 32-2 to second RIS 96-2. The antenna elements 100 on RIS 96-1 may be programed to reflect THF signals 32-1 by angle Δ towards UE device 10. The antenna elements 100 on RIS 96-2 may be programed to reflect THF signals 32-2 by angle γ towards UE device 10. When each AP transmits a respective data stream, THF signals 32-1 and 32-2 will not coherently combine at the location of UE device 10 but the UE device may receive two separate, parallel data streams which may double the data rate of UE device 10 (e.g., using spatial multiplexing). When each AP transmits the same data stream, THF signals 32-1 and 32-1 may coherently combine to produce an increase in signal-to-interreference-plus-noise ratio (SINR) and thus a higher rate at UE device 10 (e.g., when necessary to meet the traffic demands of UE device 10).

While the example of FIG. 16 illustrates downlink transmission of THF signals from AP 6-1 and AP 6-2 to UE device 10 via RIS 96-1 and RIS 96-2 for the sake of simplicity, RIS 96-1 and RIS 96-2 may conversely reflect THF signals during uplink transmission of the THF signals from UE devices 10 to AP 6-1 and AP 6-2. More than two AP's 6 and/or more than two RIS's 96 may be used to provide more than two parallel streams of wireless data to UE device 10. If desired, two or more streams of wireless data from two or more AP's 6 may be reflected to UE device 10 by the same RIS 96 (e.g., using TDMA, FDMA, and/or SDMA). Implementing multiple RIS's and additional receiver chains in UE device 10 may allow for a richer propagation environment (e.g., angular spreads), thereby allowing the transmission of more spatial layers (e.g., spatial multiplexing) and hence a higher rate either from a single AP 6 (e.g., transmitting towards spatially separate RIS's) or from multiple spatially separate AP's such as AP 6-1 and AP 6-2.

In general, any combination of the examples of FIGS. 12-16 may be used to provide THF capacity to one or more UE devices 10. The configuration of one or more of the RIS's (e.g., the reflection coefficients of the antenna elements 100 on the RIS) may be adjusted over time to switch between the TDMA, FDMA, SDMA, and/or MIMO arrangements shown in FIGS. 12-16 and/or to adjust how the RIS(s) reflect THF signals as needed over time to allow the RIS(s) to provide the required THF capacity to different UE devices as the UE devices move, as new UE devices attempt to perform communications, as UE devices stop performing communications, as the traffic demands of the UE devices, and/or the propagation conditions in environment 130 (FIG. 11) change over time. Deploying RIS(s) in environment 130 and configuring the RIS(s) in this way may allow for the number of AP's 6 in environment 130 to be reduced while still providing dynamic THF capacity to all areas of the environment.

Figure 17:
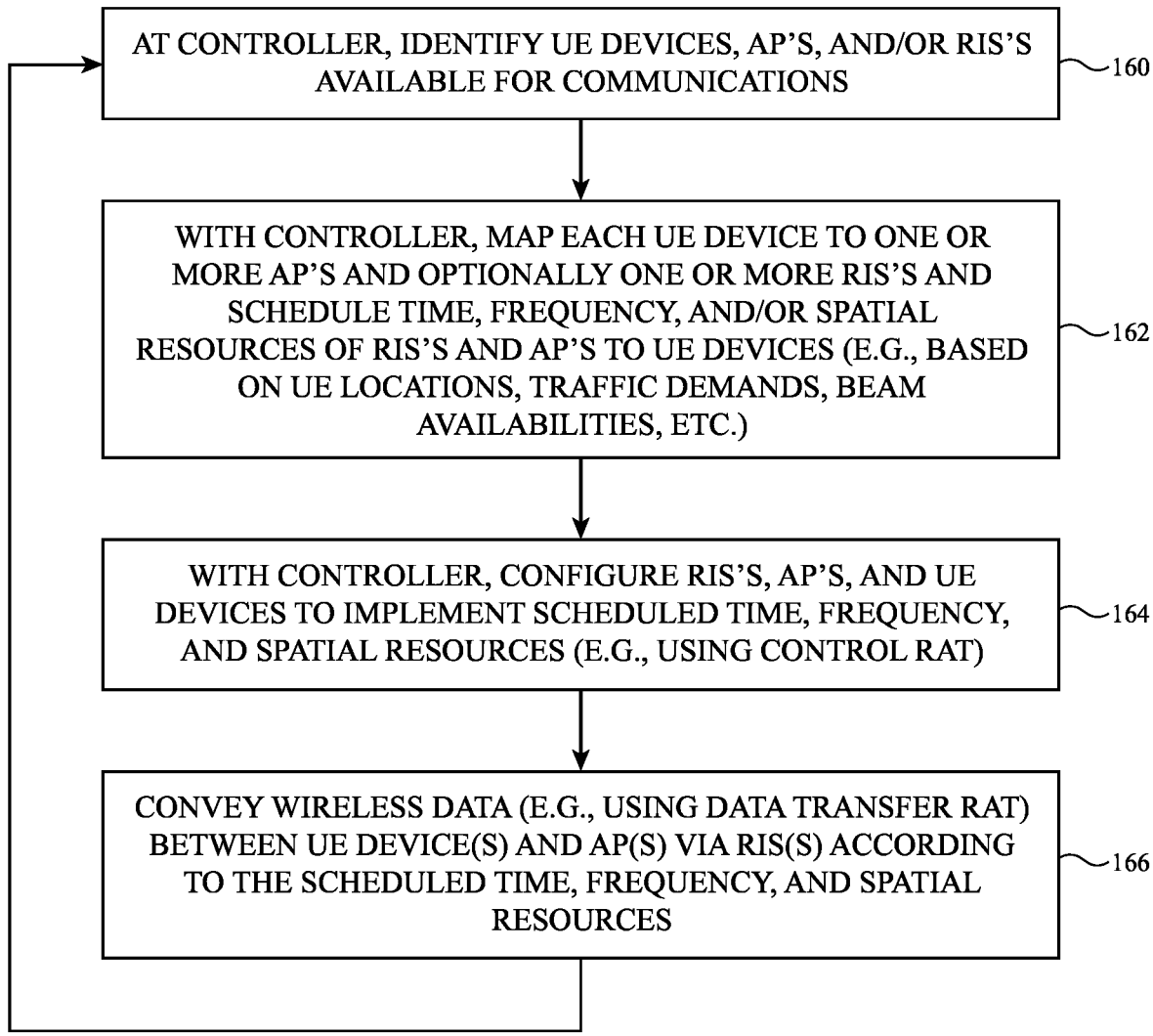
FIG. 17 is a flow chart of illustrative operations involved in establishing and performing wireless communications between one or more wireless access points and one or more user equipment devices via at least one RIS in accordance with some embodiments.

FIG. 17 is a flow chart of illustrative operations involved in establishing and performing wireless communications between one or more AP's 6 and one or more UE devices 10 via one or more RIS 96 deployed in environment 130. Wireless communications between the AP's and UE devices 10 via RIS(s) 96 in environment 130 may be controlled or managed by a controller. The controller may include one or more processors and may be implemented on one of the AP's 6 in environment 130, on one of the UE devices 10 in environment 130, on a dedicated controller that is separate from AP's 6 and UE devices (e.g., a dedicated controller device having a user input/output interface for a network administrator), may be distributed across multiple AP's 6 (e.g., one or more processors on two or more AP's 6 may perform the operations of the controller as described herein), may be distributed across multiple UE devices 10, and/or may be distributed across one or more AP's 6 and one or more UE devices 10.

At operation 160, the controller may identify (e.g., discover) the UE devices 10, AP's 6, and RIS(s) 96 in environment 130 that are available for THF communications. The controller may identify the UE devices, AP's, and RIS's using one or more sensors, using radio-frequency signals transmitted by the UE devices, AP's and RIS's (e.g., over the control RAT), and/or using beam sweeping discovery procedures performed by the AP's and the UE devices using the data transfer RAT. The controller may identify information about each of the UE devices, AP's, and RIS's such as the location and/or orientation of each of the UE devices, AP's, and RIS's within environment 130, one or more identifiers that uniquely identify the UE devices, AP's, and RIS's, and/or information identifying the capabilities of the UE devices, AP's and RIS's.

If desired, the controller may receive some or all of this information from the UE devices, AP's, and/or RIS's in radio-frequency signals transmitted over the control RAT. This information may include capability identifiers identifying one or more capabilities of the RIS(s). The capability identifiers may include a capability identifier indicating the number of programmable antenna elements 100 on each RIS, the number of groups of programmable antenna elements, information identifying the geometry of the RIS and/or its array 98, an identifier indicating the number of programmable codebooks on each RIS 96 and/or other information identifying one or more entries of the codebook (s), amplitudes, phases, and/or polarizations that are available for each of the programmable antenna elements 100 in array 98 on each RIS (e.g., amplitude bits, phase bits, and/or polarization bits that can be used by RIS 96 to control the amplitude, phase, and/or polarization of THF signals reflected by antenna elements 100), information on the speed with which each RIS is able to change its reflective response, information identifying the timing synchronization procedures of each RIS and/or the accuracy of timing synchronization, information about supported autonomous RIS signal beam variation procedures and associated parameters, etc.

At operation 162, the controller may map each identified UE device 10 to one or more identified AP 6 that is to provide the UE device with THF capacity. If a UE device 10 has a LOS with an AP, that AP may be mapped to the UE device. If a UE device does not have a LOS with any AP, the UE device may be mapped to one or more RIS 96 in environment 130 as well as one or more AP's 6 (e.g., RIS(s)

that have sufficient field(s) of view to reflect THF signals between the AP(s) and the UE device). The controller may schedule time, frequency, and/or spatial resources of the RIS's and AP's to the corresponding (mapped) UE devices. For example, the controller may schedule and configure each RIS to implement an SDMA scheme between multiple AP's and one or more UE devices (e.g., as shown in FIGS. 12 and 13), a TDMA scheme between an AP and multiple UE devices (e.g., as shown in FIGS. 14 and 15), an FDMA scheme between an AP and multiple UE devices (e.g., as shown in FIGS. 14 and 15), a MIMO scheme between multiple AP's and a single UE device (e.g., as shown in FIG. 16), or a combination of two or more of these schemes. The schedule may include beam settings for the RIS's, AP's, and UE devices (e.g., AP beams, RIS beams, and UE beams and/or the corresponding antenna settings to form the beams as necessary to implement the schedule). If desired, the controller may generate settings for the antenna elements on each RIS to use (e.g., phase and magnitude settings, complex reflection coefficients, impedances, RIS beams, etc.) that configure the RIS to form the RIS beams needed to implement the schedule.

If desired, the configuration of beams from the AP's 6 to RIS's 96 in environment 130 (e.g., RIS-AP beams and AP beams) may be preconfigured upon installation of AP's 6 and RIS's 96. Additionally or alternatively, the controller may perform control RAT discovery and then data transfer RAT discovery to allow each AP to discover AP beams that point towards the corresponding (mapped) RIS(s) 96 and RIS-AP beams that point towards the corresponding (mapped) AP's 6. If desired, the controller may control the UE devices 10 to perform discovery operations to identify suitable RIS-UE beams for each RIS 96. The discovery operations may include control RAT discovery and/or data transfer RAT discovery. The data transfer RAT discovery may involve AP(s) 6 and/or UE device(s) 10 transmitting THF signals while the RIS sweeps over different RIS-UE beams and/or while the UE sweeps over different UE beams until adequate beams are found (e.g., UE beams that point to the RIS 96 mapped to the UE devices and RIS-UE beams that point to the mapped UE devices 10). Sensor information gathered at the UE devices may be used to help facilitate the discovery procedures if desired.

The schedule may be generated based on the locations of the UE devices 10 in environment 130 (e.g., as identified at operation 160), the traffic demands of each UE device (e.g., as identified at operation 160), and/or the beam availabilities of the UE devices, RIS's, and/or AP's (e.g., as identified at operation 160) in a way that optimizes the wireless performance of each UE device 10 based on its current or projected needs given the reduced number of AP's 6 within environment 130 (e.g., in a deployment in which each area 134 of environment 130 is not provided with a respective AP 6). When multiple UE devices 10 are served by (mapped to) the same RIS 96, the controller can select serving AP's 6 in a manner such that reflections from the RIS do not create inter-user or beam interference (e.g., using the SDMA, FDMA, and/or TDMA scheme). When multiple AP's 6 and/or multiple RIS's 96 could serve a given UE device 10 with satisfactory levels of performance, the controller may select a most suitable beam configuration to use for the UE device (e.g., AP and RIS signal beams that would minimize pathloss, exhibit interference-free reflection angles, that implement beneficial RIS partitioning, etc.).

At operation 164, the controller may configure the RIS's 96, AP's 6, and UE devices 10 in environment 130 (e.g., as identified at operation 160) to implement the generated schedule. This may include controlling each AP 6 to form AP beams that point to the mapped RIS(s) (or that point directly to UE devices 10 having LOS), controlling each RIS 96 to form RIS beams that serve to reflect THF signals between AP(s) 6 and the corresponding (mapped) UE devices 10, and/or controlling each UE device 10 to form UE beams that point towards the corresponding (mapped) RIS(s) 96. The controller may also control the timing and frequency resources with which the AP's 6 and UE devices 10 transmit and receive THF signals and with which the RIS's 96 reflect THF signals. This may include, for example, controlling the RIS's to switch antenna settings to implement a TDMA and/or FDMA scheme in the schedule and/or controlling the RIS's to implement or switch antenna settings for different sets of antenna elements to implement an SDMA scheme. The configuration of operation 164 may occur over the control RAT (e.g., the controller may use the control RAT to instruct the RIS's, UE devices, and AP's to implement the schedule).

At operation 166, the AP's 6 and UE devices 10 may convey wireless data over the data transfer RAT using THF signals that are reflected off of the RIS's 96 according to the time, frequency, and spatial resources assigned to the RIS's, AP's, and UE devices in the schedule. Each RIS 96 may reflect THF signals to/from one or more UE devices and to/from one or more AP's using the TDMA, FDMA, and/or SDMA scheme implemented by the schedule. The control RAT may be used to update the schedule as necessary over time (e.g., processing may loop back to operation 160 as the active UE devices 10, RIS's 96, and/or AP's 6 in environment 130 or their position or traffic demands change over time).

In this way, the controller may allow for adaptive, fine-granular resource sharing between the multiple UE devices 10 in environment 130. If there are not more active UE devices 10 than AP's 6, each UE device 10 may be provided with the full temporal and frequency resources of an entire AP 6 dedicated to that UE device (e.g., via a suitable RIS 96). If there are more active UE devices 10 than AP's 6, the controller can share one or more AP's between UE devices 10 (e.g., using TDMA and/or FDMA) while selecting the most compatible configurations (e.g., max sum rates) based on traffic demands The controller may also configure two or more RIS's and AP's to perform distributed MIMO (e.g., by assigning multiple RIS's or partitions of a single RIS (sets of antenna elements on a single RIS) to serve a single UE device 10), thereby increasing THF capacity for that UE device relative to when the UE device is served by only a single AP. In other words, by deploying RIS's 96 in environment 130, THF capacity may be provided to UE devices at different locations within environment 130 without requiring deployment of AP's having LOS to every location within environment 130. This may meet the THF communications requirements of the UE devices in the environment while minimizing the number of required AP's, thereby minimizing deployment, installation, and maintenance costs of the system.

Figure 18:
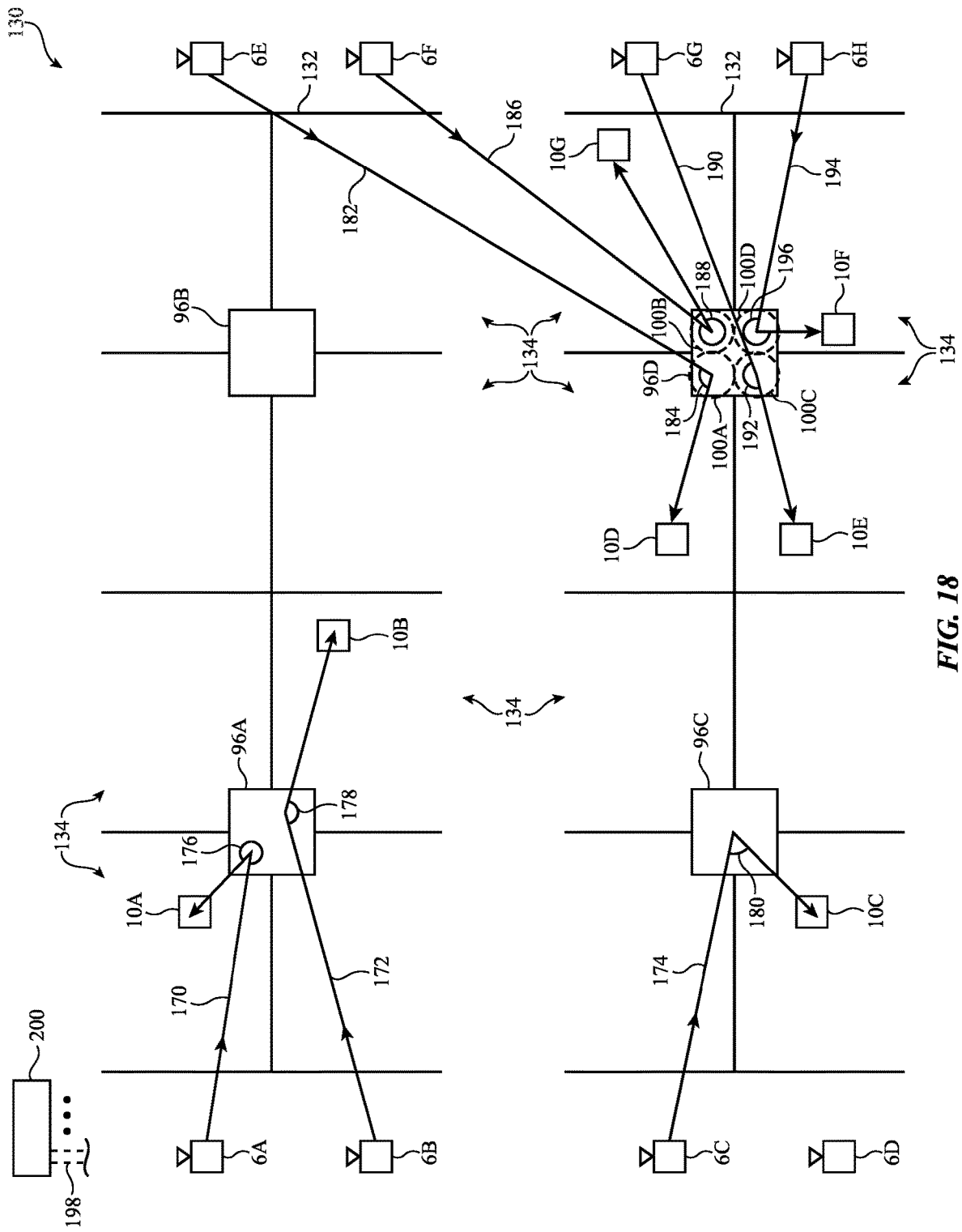
FIGS. 18 and 19 are top views of an illustrative environment showing examples of how multiple wireless access points may direct signals towards different user equipment devices via at least one RIS in accordance with some embodiments.
Figure 19:
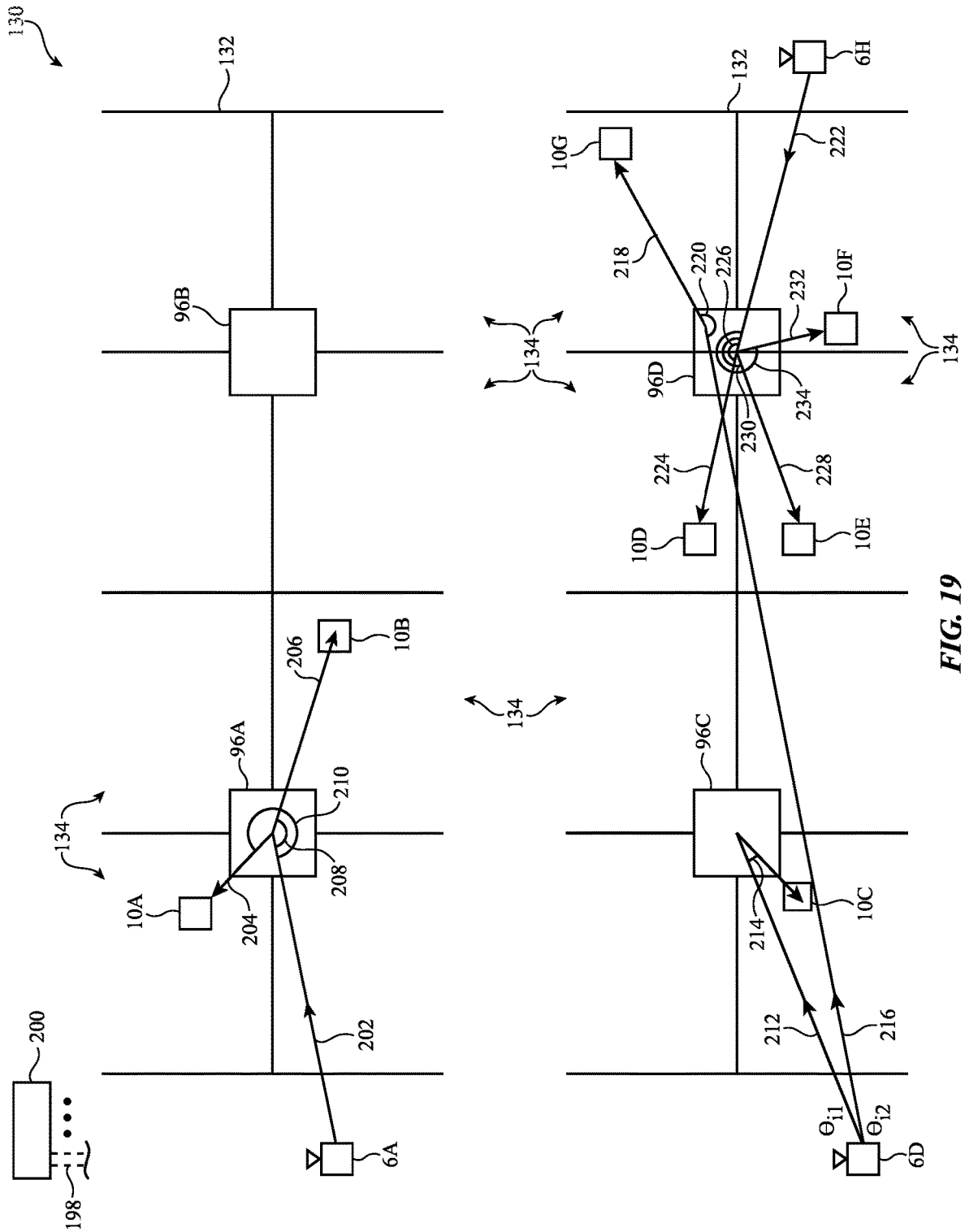

FIGS. 18 and 19 show two examples of how RIS's 96 may be deployed in environment 130 and illustrate various ways in which the RIS's may be used to concurrently provide THF capacity to multiple UE devices 10 in environment 130, without requiring AP's 6 in each area 134 of environment 130. As shown in FIG. 18, environment 130 may include a set of four RIS's 96 such as RIS 96A, RIS 96B, RIS 96C, and RIS 96D. Each RIS may serve four corresponding regions 134 in environment 130. There may be multiple UE devices 10 distributed around environment 130 such as UE devices 10A-10G. In the example of FIGS. 18 and 19, UE devices 10A and 10B are located in areas 134 served by RIS 96A, UE device 10C is located in an area 134 served by RIS 96C, UE devices 10D-10G are located in areas 134 served by RIS 96D, and RIS 96B has no UE devices in its areas 134.

In the example of FIG. 18, there are eight AP's deployed in environment 130 (e.g., AP's 6A, 6B, 6C, and 6D deployed on the left side of environment 18 and AP's 6E, 6F, 6G, and 6H deployed on the right side of environment 18), where seven of the AP's are active (e.g., one or more deployed AP such as AP 6D may be inactive when not needed to provide THF capacity to the UE devices in environment 130). This is less than the sixteen AP's that would otherwise be required to serve all sixteen areas 134 in environment 130 in the absence of RIS's 96, thereby reducing deployment and operating cost of the communications system. A controller such as controller 200 may be communicably coupled to AP's 6A-6H over control paths 198 (e.g., wired and/or wireless links) and/or may be logically distributed across the processing circuitry of one or more of AP's 6A-6H and/or UE devices 10.

In the example of FIG. 18, there are more AP's 6 than UE devices 10. As such, each UE device 10 may communicate with a respective (dedicated) AP 6 and receives the full time and frequency resources of the corresponding AP, thereby maximizing wireless performance and throughout of the UE devices. As shown in FIG. 18, AP's 6A and 6B may serve respective UE devices 10A and 10B via RIS 96A (e.g., controller 200 may map UE devices 10A and 10B to RIS 96A and to AP's 6A and 6B, respectively, while processing operation 162 of FIG. 17). AP 6C may serve UE device 10C via RIS 96C (e.g., controller 200 may map UE device 10C to RIS 96C and AP 6C while processing operation 162 of FIG. 17). AP's 6E, 6F, 6G, and 6H may serve respective UE devices 10D, 10G, 10E, and 10F via RIS 96D (e.g., controller 200 may map UE devices 10D, 10E, 10G, and 1OF to RIS 96D and AP's 6E, 6G, 6F, and 6H, respectively, while processing operation 162 of FIG. 17). The AP-RIS-UE mappings may be selected in a way that minimizes interference between streams of wireless data given the locations of the UE devices, the RIS's, and the AP's in environment 130, based on the traffic demands of each UE device, based on current signal propagation conditions, etc.

Controller 200 may schedule (e.g., configure or program) RIS 96A and AP's 6A and 6B to perform SDMA with UE devices 10A and 10B (e.g., while processing operations 162 and 164 of FIG. 17). This may, for example, involve configuring the antenna elements 100 on RIS 96A to reflect incident THF signals from AP's 6A and 6B in corresponding directions. AP 6A may transmit THF signals 170 towards RIS 96A (e.g., towards a first set of antenna elements 100 on RIS 96A as shown in FIG. 12 or towards all the antenna elements as shown in FIG. 13). AP 6B may concurrently transmit THF signals 172 towards RIS 96A (e.g., towards a second set of antenna elements 100 on RIS 96A as shown in FIG. 12 or towards all the antenna elements as shown in FIG. 13). RIS 96A may reflect the incident THF signals 170 by angle 176 towards UE device 10A. RIS 96A may concurrently reflect the incident THF signals 172 by angle 178 towards UE device 10B. Interference between the streams of wireless data for UE devices 10A and 10B may be prevented by the spatial separation of THF signals 170 and 172 at the locations of UE devices 10A and 10B.

Controller 200 may schedule (e.g., configure or program) RIS 96C to reflect THF signals between UE devices 10C and AP 6C (e.g., while processing operations 162 and 164 of FIG. 17). This may, for example, involve configuring the antenna elements 100 on RIS 96C to reflect incident THF signals from AP 6C in a corresponding direction. AP 6C may transmit THF signals 174 towards RIS 96C (e.g., while processing operation 166 of FIG. 17). RIS 96C may reflect the incident THF signals 174 by angle 180 towards UE device 10C. SDMA need not be performed because only a single UE device is assigned to RIS 96C. RIS 96B and AP 6D are not mapped to any UE devices in this example and are therefore not scheduled for communications.

Controller 200 may schedule (e.g., configure or program) RIS 96D and AP's 6E, 6F, 6G, and 6H to perform SDMA with UE devices 10D-G (e.g., while processing operations 162 and 164 of FIG. 17). This may, for example, involve configuring the antenna elements 100 on RIS 96D to reflect incident THF signals from AP's 6E-H in corresponding directions. AP 6E may transmit THF signals 182 towards RIS 96D (e.g., towards a first set of antenna elements 100A on RIS 96D or towards all the antenna elements as shown in FIG. 13). AP 6F may concurrently transmit THF signals 186 towards RIS 96D (e.g., towards a second set of antenna elements 100B on RIS 96D or towards all the antenna elements as shown in FIG. 13). AP 6G may concurrently transmit THF signals 190 towards RIS 96D (e.g., towards a third set of antenna elements 100C on RIS 96D or towards all the antenna elements as shown in FIG. 13). AP 6H may concurrently transmit THF signals 194 towards RIS 96D (e.g., towards a fourth set of antenna elements 100D on RIS 96D or towards all the antenna elements as shown in FIG. 13).

RIS 96D may reflect the incident THF signals 182 by angle 184 towards UE device 10D. RIS 96D may concurrently reflect the incident THF signals 186 by angle 188 towards UE device 10G. RIS 96D may concurrently reflect the incident THF signals 190 by angle 192 towards UE device 10E. RIS 96D may concurrently reflect the incident THF signals 194 by angle 196 towards UE device 10F. Interference between the streams of wireless data for UE devices 10D-G may be prevented by the spatial separation of THF signals 182, 186, 190, and 194 at the locations of UE devices 10D-G. While the example of FIG. 18 illustrates downlink transmission of THF signals from the AP's to the UE devices for the sake of simplicity, the RIS's may conversely reflect THF signals during uplink transmission from the UE devices to the AP's.

The example of FIG. 18 illustrates different ways AP's 6 may be assigned to UE devices 10 in environment 130 when there are more AP's than UE devices, thereby allowing each UE device to be served by a dedicated AP via a corresponding RIS 96. In situations where there are more UE devices than AP's available in environment 130, controller 200 may additionally or alternatively schedule the UE devices, RIS's, and AP's to convey THF signals using a TDMA and/or FDMA scheme. FIG. 19 shows an example of ways in which the RIS's may be used to concurrently provide THF capacity to multiple UE devices 10 in environment 130 when there are more UE devices than AP's available in environment 130.

As shown in FIG. 19, there may only be three AP's 6 deployed in environment 130 (e.g., AP's 6A, 6D, and 6H). Such a deployment may involve even lower deployment, installation, and operating cost than the example of FIG. 18. As there are more UE devices 10 than AP's in this deployment, the time and/or frequency resources of each AP 6 need to be split between UE devices 10 to minimize interference of the streams of wireless data for each UE device.

AP 6A may serve UE devices 10A and 10B via RIS 96A (e.g., controller 200 may map UE devices 10A and 10B to RIS 96A and to AP 6A while processing operation 162 of FIG. 17). AP 6D may serve UE device 10C via RIS 96C and may serve UE device 10G via RIS 96D (e.g., controller 200 may map UE device 10C to RIS 96C and AP 6D and may map UE device 10G and RIS 96D to AP 6D while processing operation 162 of FIG. 17). AP 6H may serve UE devices 10D, 10F, and 10E via RIS 96D (e.g., controller 200 may map UE devices 10D, 10F, and 10E, 10G to RIS 96D and AP 6H while processing operation 162 of FIG. 17). The AP-RIS-UE mappings may be selected in a way that minimizes interference between streams of wireless data given the locations of the UE devices, the RIS's, and the AP's in environment 130, based on the traffic demands of each UE device, based on current signal propagation conditions, etc.

Controller 200 may schedule (e.g., configure or program) RIS 96A, AP 6A, and UE devices 10A and 10B to convey THF signals using a TDMA scheme (e.g., while processing operations 162 and 164 of FIG. 17 and using a TDMA scheme as shown in FIG. 14). This may, for example, involve configuring the antenna elements 100 on RIS 96A to reflect incident THF signals from AP 6A in different directions during different time periods. AP 6A may transmit THF signals 202 towards RIS 96A. During first time periods, THF signals 202 may include a first stream of wireless data for UE device 10A and RIS 96A may reflect the incident THF signals 202 by angle 210 towards UE device 10A (as shown by reflected signals 204). During second time periods, THF signals 202 may include a second stream of wireless data for UE device 10B and RIS 96A may reflect the incident THF signals 202 by angle 208 towards UE device 10B (as shown by reflected signals 206). The division of temporal resources of AP 6A may prevent interference between the first and second streams of wireless data.

Controller 200 may schedule (e.g., configure or program) AP 6D to transmit THF signals between RIS 96C and RIS 96D using a TDMA scheme (e.g., as shown in FIG. 15). During first time periods, AP 6D may transmit a third stream of wireless data in THF signals 212 towards RIS 96C (e.g., at incident angle ei1). RIS 96C may be configured or programmed to reflect THF signals 212 by angle 214 towards UE device 10C. During second time periods, AP 6D may transmit a fourth stream of wireless data in THF signals 216 towards RIS 96D (e.g., at incident angle 0,2). RIS 96D may be configured or programmed to reflect THF signals 216 by angle 220 towards UE device 10G, as shown by arrow 218. If desired, TDMA, FDMA, and/or SDMA may be used to prevent interference of THF signals 216 with the THF signals from AP 6H that are incident upon RIS 96D (e.g., THF signals 216 may be transmitted towards a different set of antenna elements 100 on RIS 96D, may be transmitted at a different frequency, and/or may be transmitted at a different time than the THF signals from AP 6H). The division of temporal resources of AP 6A may prevent interference between the third and fourth streams of wireless data.

Controller 200 may schedule (e.g., configure or program) RIS 96D, AP 6H, and UE devices 10D, 10E, and 1OF to convey THF signals using an FDMA scheme (e.g., while processing operations 162 and 164 of FIG. 17 and using al-DMA scheme as shown in FIG. 14). AP 6H may transmit THF signals 222 towards RIS 96D. THF signals 222 may concurrently include a fifth stream of wireless data for UE device 10D at first frequencies, a sixth stream of wireless data for UE device 10E at second frequencies, and a seventh stream of wireless data for UE device 1OF at third frequencies. RIS 96D may reflect the first frequencies in incident THF signals 222 by angle 226 towards UE device 10D, as shown by arrow 224. RIS 96D may concurrently reflect the second frequencies in incident THF signals 222 by angle 230 towards UE device 10E, as shown by arrow 228. RIS 96D may concurrently reflect the third frequencies in incident THF signals 222 by angle 234 towards UE device 10F, as shown by arrow 232. The division of frequency resources of AP 6H may prevent interference between the fifth, sixth, and seventh streams of wireless data. Isolation between the streams fifth, sixth, and seventh streams of wireless data may be further increased by combining the FDMA scheme with a SDMA scheme and/or an FDMA scheme.

While the example of FIG. 19 illustrates downlink transmission of THF signals from the AP's to the UE devices for the sake of simplicity, the RIS's may conversely reflect THF signals during uplink transmission from the UE devices to the AP's. In general, the TDMA, FDMA, and SDMA schemes described herein may be combined in any manner across any number of RIS's from any number of AP's for any number of UE devices 10 at any locations in environment 130. A distributed MIMO scheme (e.g., as shown in FIG. 16) may also be used. If desired, the AP may transmit THF signals to a UE device directly via LOS in addition to one or more UE devices via reflection off a RIS (e.g., using a TDMA or FDMA scheme). If desired, the THF signals may reflect off of multiple RIS's in passing between an AP and the mapped UE device. The examples of FIGS. 18 and 19 illustrate some of the combinations of signal transmission and reception schemes that may be used to provide THF capacity to the UE devices in environment 130. Controller 200 may adjust the communications schedule over time based on the active UE devices, locations, and traffic demands of environment 130 at any time. In this way, RIS's 96 may be used to provide sufficient and dynamic (adaptive) THF capacity to all of environment 130 while minimizing the number of AP's 6 in environment 130, thereby minimizing deployment, installation, and operation costs of the communications system.

As used herein, the term "concurrent" means at least partially overlapping in time. In other words, first and second events are referred to herein as being "concurrent" with each other if at least some of the first event occurs at the same time as at least some of the second event (e.g., if at least some of the first event occurs during, while, or when at least some of the second event occurs). First and second events can be concurrent if the first and second events are simultaneous (e.g., if the entire duration of the first event overlaps the entire duration of the second event in time) but can also be concurrent if the first and second events are non-simultaneous (e.g., if the first event starts before or after the start of the second event, if the first event ends before or after the end of the second event, or if the first and second events are partially non-overlapping in time). As used herein, the term "while" is synonymous with "concurrent."

UE device 10 may gather and/or use personally identifiable information. It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The methods and operations described above in connection with FIGS. 1-19 may be performed by the components of UE device 10, RIS 96, and/or AP 6 using software, firmware, and/or hardware (e.g., dedicated circuitry or hardware). Software code for performing these operations may be stored on non-transitory computer readable storage media (e.g., tangible computer readable storage media) stored on one or more of the components of UE device 10, RIS 96, and/or AP 6. The software code may sometimes be referred to as software, data, instructions, program instructions, or code. The non-transitory computer readable storage media may include drives, non-volatile memory such as non-volatile random-access memory (NVRAM), removable flash drives or other removable media, other types of random-access memory, etc. Software stored on the non-transitory computer readable storage media may be executed by processing circuitry on one or more of the components of UE device 10, RIS 96, and/or AP 6. The processing circuitry may include microprocessors, central processing units (CPUs), application-specific integrated circuits with processing circuitry, or other processing circuitry.

The foregoing is merely illustrative and various modifications can be made to the described embodiments. The foregoing embodiments may be implemented individually or in any combination.

What is claimed is:

1. A method of operating a wireless communications system, the method comprising:
   transmitting, using a first wireless access point, a first stream of wireless data to a first user equipment (UE) device via a first signal beam formed by one or more antennas of the first wireless access point, the first signal beam being oriented to reflect off a set of antenna elements of a reconfigurable intelligent surface (RIS); and
   transmitting, using a second wireless access point, a second stream of wireless data to a second UE device that is different from the first UE device via a second signal beam formed by one or more antennas of the second wireless access point, the second signal beam being oriented to reflect off the set of antenna elements of the RIS concurrent with reflection of the first signal beam.

2. The method of claim 1, wherein the first signal beam overlaps an entirety of the set of antenna elements.

3. The method of claim 2, wherein the second signal beam overlaps the entirety of the set of antenna elements.

4. The method of claim 3, further comprising:
   transmitting, using the first wireless access point, a control signal to the RIS that controls the set of antenna elements on the RIS to exhibit a set of reflection coefficients that configures the set of antenna elements to reflect the first signal beam onto first and second reflected angles and that configures the set of antenna elements to reflect the second signal beam onto third and fourth reflected angles.

5. The method of claim 4, wherein the first signal beam is incident upon the RIS from a first direction, the second signal beam is incident upon the RIS from a second direction different than the first direction, the first reflected angle is separated from the first direction by a first angle, the second reflected angle is separated from the first direction by a second angle, the first reflected angle is oriented towards the first UE device, the third reflected angle is separated from the second direction by the first angle, the fourth reflected angle is separated from the second direction by the second angle, and the second reflected angle is oriented towards the second UE device.

6. The method of claim 1, wherein transmitting the first stream of wireless data comprises transmitting the first stream of wireless data towards the RIS during first time periods and transmitting the second stream of wireless data comprises transmitting the second stream of wireless data towards the RIS during second time periods that are different from the first time periods.

7. The method of claim 1, wherein transmitting the first stream of wireless data comprises transmitting the first stream of wireless data towards the RIS in a first frequency band and transmitting the second stream of wireless data comprises transmitting, concurrent with transmission of the first stream of wireless data in the first frequency band, the second stream of wireless data towards the RIS in a second frequency band that is different from the first frequency band.

8. The method of claim 1, wherein the first signal beam is configured to reflect off an entirety of the set of antenna elements.

9. The method of claim 8, wherein transmitting the first stream of wireless data comprises transmitting the first stream of wireless data towards the RIS during first time periods and transmitting the second stream of wireless data comprises transmitting the second stream of wireless data towards the RIS during second time periods that are different from the first time periods.

10. The method of claim 1, wherein the second wireless access point is spatially separated from the first wireless access point and the second UE device is spatially separated from the first UE device.

11. The method of claim 10, wherein transmitting the first stream of wireless data comprises transmitting the first stream of wireless data towards the RIS during first time periods and transmitting the second stream of wireless data comprises transmitting the second stream of wireless data towards the second UE device during second time periods that are interleaved with the first time periods.

12. The method of claim 10, wherein transmitting the first stream of wireless data comprises transmitting the first stream of wireless data towards the RIS in a first frequency band and transmitting the second stream of wireless data comprises transmitting, concurrent with transmission of the first stream of wireless data in the first frequency band, the second stream of wireless data towards the second UE device in a second frequency band that is different from the first frequency band.

13. A method of operating a wireless communications system, the method comprising:
   configuring a set of antenna elements on a reconfigurable intelligent surface (RIS) to exhibit a set of reflection coefficients; and
   while the set of antenna elements exhibits the set of reflection coefficients, using the set of antenna elements to concurrently
      reflect, towards a first user equipment (UE) device, a first radio-frequency signal transmitted by a first wireless access point, wherein the first radio-frequency signal is incident upon the RIS from a first direction, the set of reflection coefficients configures the set of antenna elements to reflect the first radio-frequency signal from the first direction onto a first reflected angle and a second reflective angle, the first reflected angle has a first magnitude relative to the first direction, and the second reflected angle has a second magnitude relative to the first direction that is different from the first magnitude, and
      reflect, towards a second UE device that is different from the first UE device, a second radio-frequency signal transmitted by a second wireless access point that is different from the first wireless access point.

14. The method of claim 13, wherein the first reflected angle is oriented towards the first UE device, the second radio-frequency signal is incident upon the RIS from a second direction different than the first direction, the set of reflection coefficients configures the set of antenna elements to reflect the second radio-frequency signal from the second direction onto a third reflected angle and a fourth reflected angle, and the fourth reflected angle is oriented towards the second UE device.

15. The method of claim 14, wherein the third reflected angle has the first magnitude relative to the second direction and the fourth reflected angle has the second magnitude relative to the second direction.

16. The method of claim 13, wherein configuring the set of antenna elements comprises transmitting a control signal from the first wireless access point to the RIS.

17. The method of claim 13, wherein configuring the set of antenna elements comprises transmitting a control signal from the first UE device to the RIS.

18. The method of claim 17, wherein the control signal is transmitted at a lower frequency than the first and second radio-frequency signals.

19. A method of operating a wireless communications system, the method comprising:

configuring a set of antenna elements on a reconfigurable intelligent surface (RIS) to exhibit a set of reflection coefficients; and while the set of antenna elements exhibits the set of reflection coefficients, using the set of antenna elements to concurrently reflect, towards a first user equipment (UE) device, a first radio-frequency signal transmitted by a first wireless access point, and reflect, towards a second UE device that is different from the first UE device, a second radio-frequency signal transmitted by a second wireless access point, and that is different from the first wireless access point, wherein the first radio-frequency signal is incident within a first signal beam of the first access point, the first signal beam overlaps an entirety of the set of antenna elements, the second radio-frequency signal is incident within a second signal beam of the second access point, and the second signal beam overlaps the entirety of the set of antenna elements.

20. The method of claim 19, wherein configuring the set of antenna elements comprises transmitting a control signal from the first wireless access point to the RIS.

* * * * *